United States Patent
Miyamoto

(10) Patent No.: US 10,120,602 B2
(45) Date of Patent: Nov. 6, 2018

(54) DEVICE AND METHOD FOR DETERMINING DATA PLACEMENT DESTINATION, AND PROGRAM RECORDING MEDIUM

(71) Applicant: NEC Corporation, Tokyo (JP)

(72) Inventor: Takamichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/563,762

(22) PCT Filed: Mar. 22, 2016

(86) PCT No.: PCT/JP2016/001640
§ 371 (c)(1),
(2) Date: Oct. 2, 2017

(87) PCT Pub. No.: WO2016/157826
PCT Pub. Date: Oct. 6, 2016

(65) Prior Publication Data
US 2018/0081581 A1  Mar. 22, 2018

(30) Foreign Application Priority Data

Mar. 30, 2015 (JP) ................................ 2015-067975

(51) Int. Cl.
*G06F 3/06* (2006.01)

(52) U.S. Cl.
CPC .......... *G06F 3/0631* (2013.01); *G06F 3/0604* (2013.01); *G06F 3/0611* (2013.01); *G06F 3/0644* (2013.01); *G06F 3/0673* (2013.01)

(58) Field of Classification Search
CPC .... G06F 3/0631; G06F 3/0604; G06F 3/0611; G06F 3/0644; G06F 3/0673
See application file for complete search history.

(56) References Cited

U.S. PATENT DOCUMENTS

| | | | |
|---|---|---|---|
| 2007/0022416 A1* | 1/2007 | Masuda | G06F 9/5016 717/151 |
| 2011/0209157 A1 | 8/2011 | Sumida et al. | |
| 2016/0173404 A1* | 6/2016 | Pouyllau | G06F 17/3053 709/226 |

FOREIGN PATENT DOCUMENTS

| | | |
|---|---|---|
| JP | 2000-003268 | 1/2000 |
| JP | 2003-330730 | 11/2003 |

(Continued)

OTHER PUBLICATIONS

International Search Report, PCT/JP2016/001640, dated Jun. 21, 2016.

*Primary Examiner* — Eric Cardwell
(74) *Attorney, Agent, or Firm* — Young & Thompson

(57) ABSTRACT

A data placement destination determination device enables efficiency improvement of the execution time of a program that is executed in a system mounted with a plurality of memories having differing memory bandwidth. This device includes: a program information acquisition unit acquiring required bandwidth and memory size; a system information acquisition unit acquiring the memory bandwidth and size of a candidate memory at a placement destination; a priority setting unit setting priority based on required bandwidth and priority; a first placement destination determination unit determining a placement destination for the data of the program concerned within a range that does not exceed memory size and bandwidth based on the set priorities; and a second placement destination determination unit determining a placement destination within a range that does not exceed memory size based on the set priorities, the required bandwidth of the program concerned, and the memory bandwidth of the candidate memory.

13 Claims, 26 Drawing Sheets

(56) References Cited

FOREIGN PATENT DOCUMENTS

| | | |
|---|---|---|
| JP | 2004-070862 | 3/2004 |
| JP | 2007-026094 | 2/2007 |
| JP | 2010-113482 | 5/2010 |
| JP | 2011-076516 | 4/2011 |
| JP | 2013-161110 | 8/2013 |
| JP | 2014-146366 | 8/2014 |

* cited by examiner

| MEMORY | MEMORY SIZE | MEMORY BANDWIDTH |
|---|---|---|
| MEMORY 1 | 10GB | 300GB/s |
| MEMORY2 | 300GB | 50GB/s |

Fig. 5

| PROGRAM CODE | REQUIRED SIZE | REQUIRED BANDWIDTH | EXECUTION TIME | NUMBER OF SIMULTANEOUS EXECUTIONS |
|---|---|---|---|---|
| PROGRAM1 | 0.5GB | 3GB/s | 400s | 30 |
| PROGRAM2 | 0.5GB | 2GB/s | 150s | 50 |

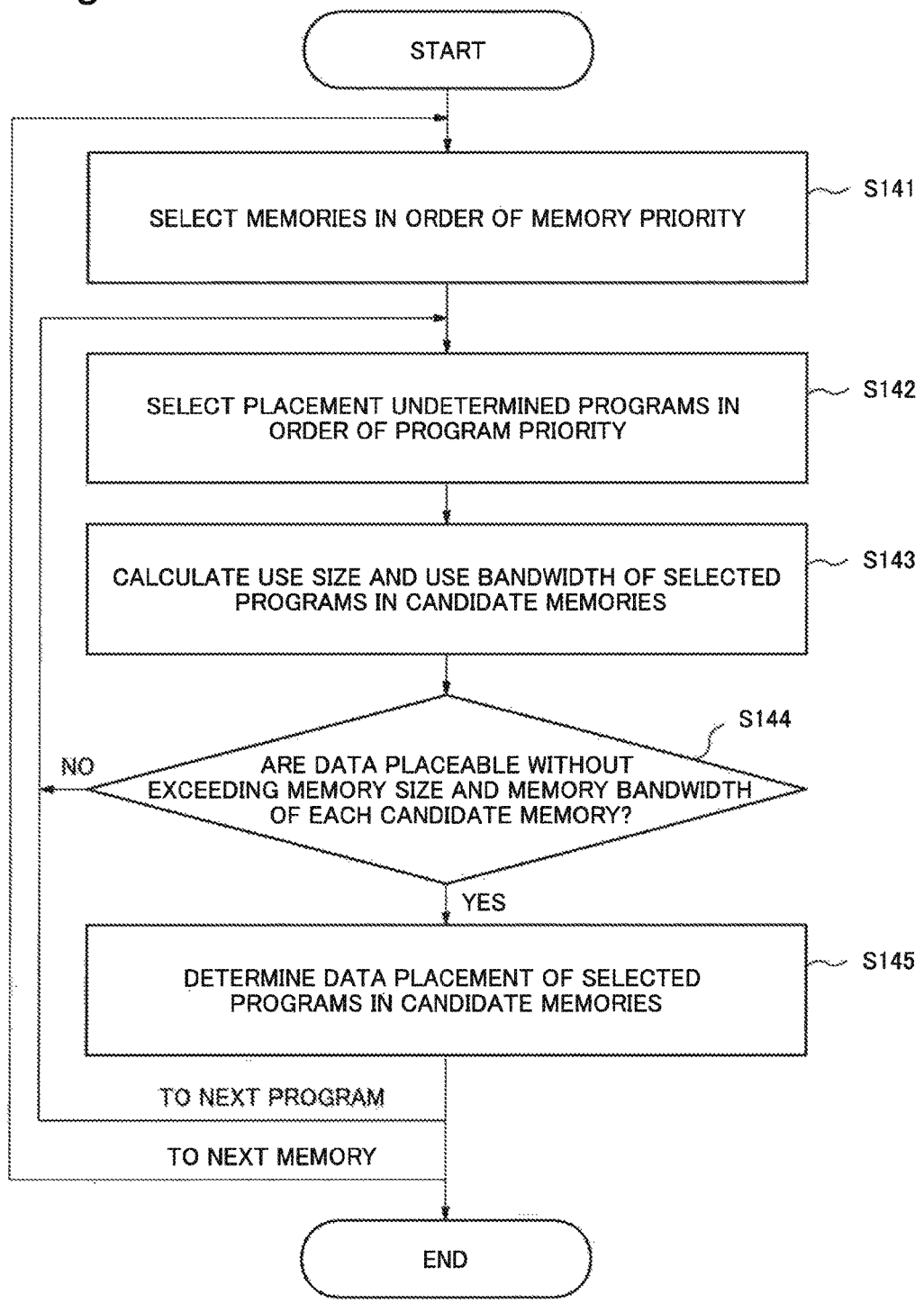

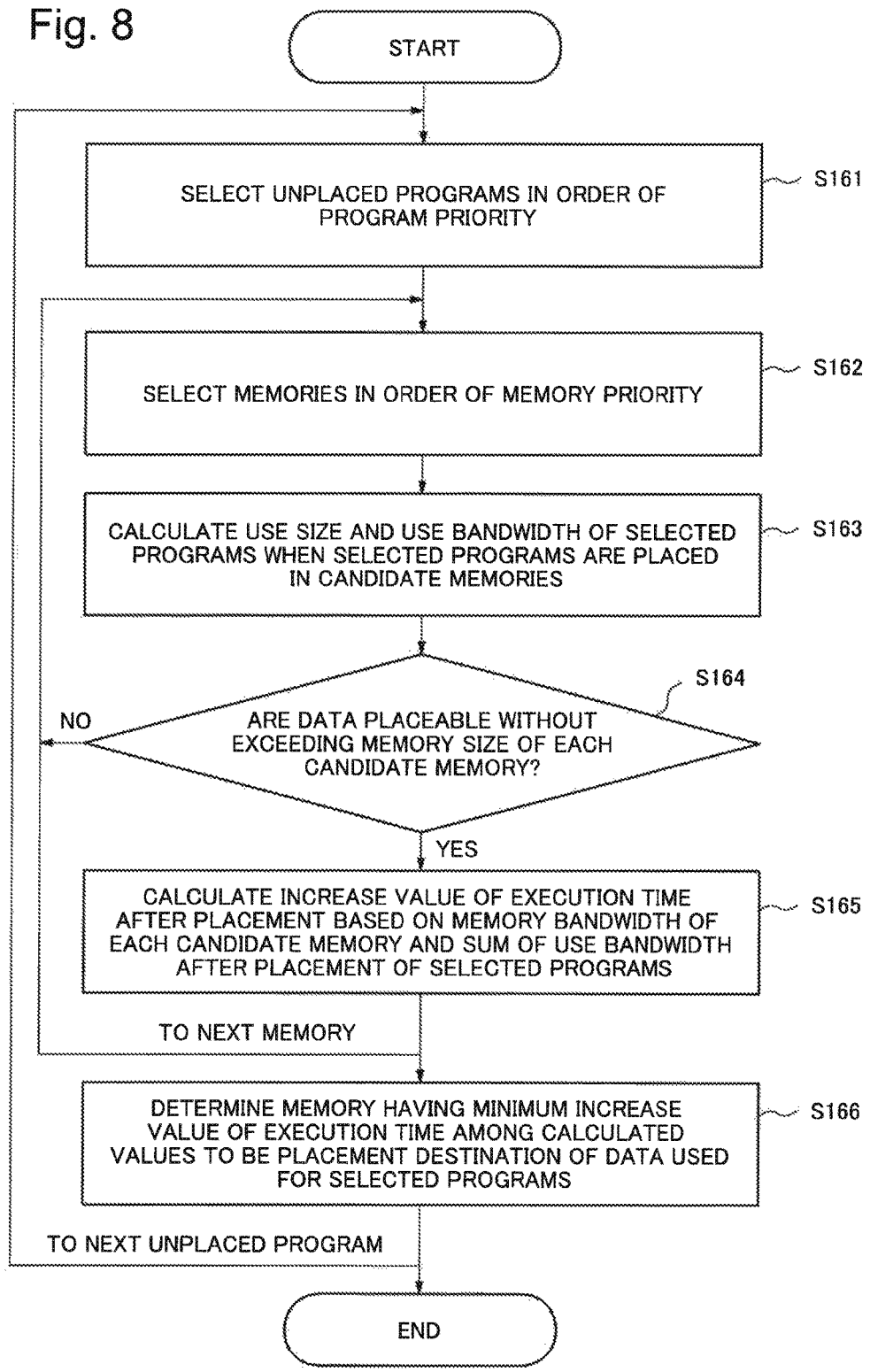

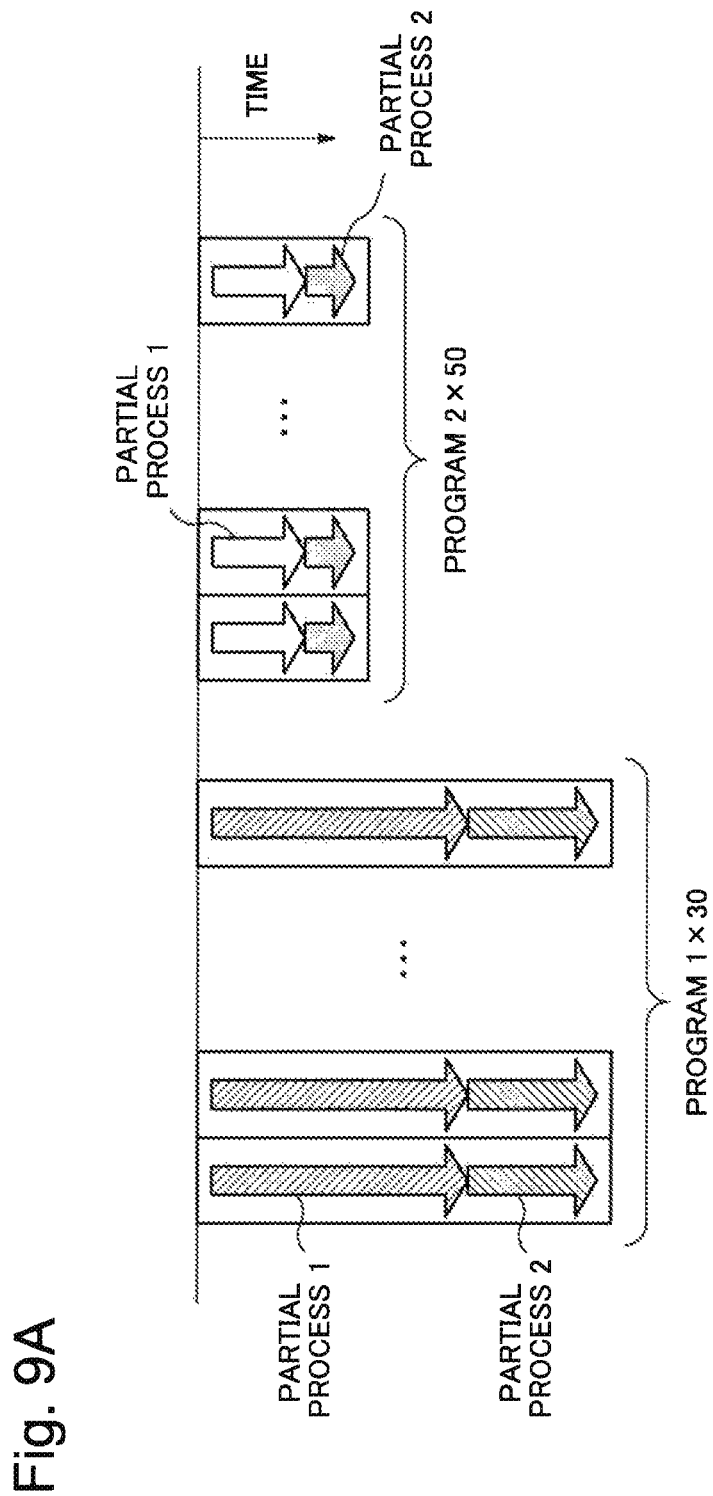

Fig. 10A

| PROGRAM CODE | NUMBER OF SIMULTANEOUS EXECUTIONS |
|---|---|
| PROGRAM 1 | 30 |
| PROGRAM 2 | 50 |

Fig. 10B

| PROGRAM 1/ PARTIAL PROCESS | REQUIRED SIZE | REQUIRED BANDWIDTH | EXECUTION TIME | NUMBER OF SIMULTANEOUS EXECUTIONS |
|---|---|---|---|---|
| PARTIAL PROCESS 1 | 0.5GB | 3GB/s | 300s | 1 |
| PARTIAL PROCESS 2 | 0.1GB | 0.5GB/s | 100s | 1 |

Fig. 10C

| PROGRAM 2/ PARTIAL PROCESS | REQUIRED SIZE | REQUIRED BANDWIDTH | EXECUTION TIME | NUMBER OF SIMULTANEOUS EXECUTIONS |
|---|---|---|---|---|
| PARTIAL PROCESS 1 | 0.5GB | 2GB/s | 100s | 1 |
| PARTIAL PROCESS 2 | 0.3GB | 1GB/s | 50s | 1 |

Fig. 14A

| PROGRAM CODE | NUMBER OF SIMULTANEOUS EXECUTIONS |
|---|---|
| PROGRAM 1 | 30 |
| PROGRAM 2 | 50 |

Fig. 14B

| PROGRAM 1/ PARTIAL PROCESS | REQUIRED BANDWIDTH | EXECUTION TIME | NUMBER OF SIMULTANEOUS EXECUTIONS | ACCESS VARIABLE |
|---|---|---|---|---|
| PARTIAL PROCESS 1 | 3GB/s | 300s | 1 | VARIABLE 1, VARIABLE 2 |
| PARTIAL PROCESS 2 | 0.5GB/s | 100s | 1 | VARIABLE 2 |

Fig. 14C

| PROGRAM 1/VARIABLE | VARIABLE SIZE |
|---|---|
| VARIABLE 1 | 0.4GB |
| VARIABLE 2 | 0.1GB |

Fig. 14D

| PROGRAM 2/ PARTIAL PROCESS | REQUIRED BANDWIDTH | EXECUTION TIME | NUMBER OF SIMULTANEOUS EXECUTIONS | ACCESS VARIABLE |
|---|---|---|---|---|
| PARTIAL PROCESS 1 | 2GB/s | 100s | 1 | VARIABLE 1, VARIABLE 2 |
| PARTIAL PROCESS 2 | 1GB/s | 50s | 1 | VARIABLE 2 |

Fig. 14E

| PROGRAM 2/VARIABLE | VARIABLE SIZE |
|---|---|
| VARIABLE 1 | 0.2GB |
| VARIABLE 2 | 0.3GB |

DEVICE AND METHOD FOR DETERMINING DATA PLACEMENT DESTINATION, AND PROGRAM RECORDING MEDIUM

TECHNICAL FIELD

The present invention relates to a device for determining a data placement destination that determines a data placement destination memory for data used for a program, a method for determining a data placement destination, and a recording medium of a data placement destination determination program.

BACKGROUND ART

In general, in a computer system in which a plurality of memories are coupled, a process of determining one of memories in which data (variables, objects, and the like) used for a program are placed is performed.

In association with a technique for determining a data placement destination used for a program from among a plurality of memories, for example, there are techniques described in PTL 1 to PTL 4.

For example, PTL 1 describes a method for determining a priority of a program, based on the number of accesses for each function, each variable, or each constant of the program, and placing each program in a descending order of a memory access rate within an allowable range of a memory size in accordance with the determined priority.

Further, for example, PTL 2 describes a method for determining a placement destination memory, based on a frequency of execution of each function process, for an object file obtained by grouping machine language codes of program files in units of function process.

Further, for example, PTL 3 describes a method for placing each object of a source code, based on a weighting priority of each object depending on a task priority and a priority of placement, based on placement instruction information, in each area in which each object is placeable.

Further, for example, PTL 4 describes a method for placing a function that is executed a large number of times, and a function that requires a long execution time, among functions of an execution program, in a memory having a high loading speed, as far as the memory capacity permits. PTL 4 also describes a method for determining a placement destination, based on a total execution time with respect to all combinations that enable distribution and placement and that are calculated by a profiler.

CITATION LIST

Patent Literature

[PTL 1] Japanese Unexamined Patent Application Publication No. 2000-003268
[PTL 2] Japanese Unexamined Patent Application Publication No. 2003-330730
[PTL 3] Japanese Unexamined Patent Application Publication No. 2011-76516
[PTL 4] Japanese Unexamined Patent Application Publication No. 2013-161110

SUMMARY OF INVENTION

Technical Problem

In a system in which a plurality of types of memories are incorporated, the memories may have different performance. Examples of the performance of each memory include a plurality of types of items such as a memory size (capacity), a latency, and a memory bandwidth.

In recent years, a computer system in which a plurality of types of memories having different memory bandwidth are incorporated has been developed. In a case of the system to be coupled to a plurality of memories having different memory bandwidth, a total execution time of simultaneously executed programs may vary depending on which memory the data used for the simultaneously executed programs are placed.

Accordingly, it is important to determine a data placement destination in such a manner that a bandwidth required for a data placement destination memory by a program (hereinafter referred to as a required bandwidth) does not exceed a memory bandwidth of a data placement destination memory, or in such a manner that an increase in total execution time due to an excess of the memory bandwidth is minimized even when the required bandwidth exceeds the memory bandwidth.

However, none of the methods described in PTLs 1 to 4 determines a data placement destination in consideration of a bandwidth required by each of programs to be simultaneously executed.

For example, in the methods described in PTLs 1 to 3, a placement target program, a function process, a bandwidth required by an object, and simultaneous execution are not taken into consideration at all. For example, as described in PTLs 1 to 3, in the method for placing, in a high-performance memory, programs in a descending order of the number of accesses to a variable or the like, functional units in a descending order of execution frequency, or task objects in a descending order of priority, there is a possibility that data used for a program having a high required bandwidth may be placed in a low-performance memory.

Note that PTL 4 describes an example in which distribution and placement of functions for two memories having different loading speeds are determined so as to minimize a total execution time of the functions. The total execution time of programs to be simultaneously executed varies between when a memory bandwidth exceeds a required bandwidth and when the memory bandwidth does not exceed the required bandwidth. However, in PTL 4, an increase time of the total execution time of programs to be simultaneously executed when the required bandwidth exceeds the memory bandwidth is not taken into consideration at all. Note that it is difficult to calculate an increase time of the total execution time of programs to be simultaneously executed when the required bandwidth exceeds the memory bandwidth, based only on the execution time on a memory having a low loading speed and a ratio between loading speeds of memories.

Accordingly, the present invention has been made in view of the above-mentioned problem, and an object of the present invention is to improve an efficiency of an execution time of a program to be executed in a system in which a plurality of memories having different memory bandwidth are incorporated.

Solution to Problem

A first data placement destination determination device according to a first aspect of the present invention includes:
program information acquisition means for acquiring a required bandwidth and a required size of a memory for each of target programs which is a target to be determined a placement destination of data used for each of the target programs;

system information acquisition means for acquiring a memory bandwidth and a memory size for each of candidate memories which is a candidate of a placement destination of data used for the target programs;

priority setting means for setting a priority for each of the target programs based on the required bandwidth and setting a priority for each of the candidate memories based on the memory bandwidth;

first placement destination determination means for determining a placement destination of data used for each of the target programs from the candidate memories, based on the priorities set by the priority setting means, in a range not exceeding the memory size and the memory bandwidth of each of the candidate memories; and second placement destination determination means for determining a placement destination of a placement destination undetermined program whose placement destination is not determined by the first placement destination determination means, based on the priority of the placement destination undetermined program, a required bandwidth of each of the target programs, and a memory bandwidth of each of the candidate memories, in a range not exceeding the memory size of each of the candidate memories.

A first data placement destination determination method according to the present invention includes:

acquiring a required bandwidth and a required size of a memory for each of target programs which is a target to be determined a placement destination of data used for each of the target programs, and a memory bandwidth and a memory size for each of candidate memories which is a candidate of a placement destination of data used for the target programs;

setting a priority for each of the target programs based on the required bandwidth and setting a priority for each of the candidate memories based on the memory bandwidth;

determining a placement destination of data used for each of the target programs from the candidate memories, based on the priorities of the target programs and the priorities of the candidate memories, in a range not exceeding the memory size and the memory bandwidth of each of the candidate memories; and determining a placement destination of a placement destination undetermined program whose placement destination is not determined, based on the priority of the placement destination undetermined program, a required bandwidth of each of the target programs, and a memory bandwidth of each of the candidate memories, in a range not exceeding the memory size of each of the candidate memories.

A first data placement destination determination program storage medium stores a data placement destination determination program that causes a computer to execute:

a process that acquires a required bandwidth and a required size of a memory for each of target programs which is a target to be determined a placement destination of data used for each of the target programs;

a process that acquires a memory bandwidth and a memory size for each of candidate memories which is a candidate of a placement destination of data used for the target programs;

a process that sets a priority for each of the target programs based on the required bandwidth and setting a priority for each of the candidate memories based on the memory bandwidth;

a process that determines a placement destination of data used for each of the target programs from the candidate memories, based on the priorities of the target programs and the priorities of the candidate memories, in a range not exceeding the memory size and the memory bandwidth of each of the candidate memories; and a process that determines a placement destination of a placement destination undetermined program whose placement destination is not determined, based on the priority of the placement destination undetermined program, a required bandwidth of each of the target programs, and a memory bandwidth of each of the candidate memories, in a range not exceeding the memory size of each of the candidate memories.

Advantageous Effects of Invention

According to the present invention, it is possible to improve an efficiency of an execution time of a program to be executed in a system in which a plurality of memories having different memory bandwidth are incorporated.

BRIEF DESCRIPTION OF DRAWINGS

FIG. 5 is an explanatory diagram illustrating an example of program information;

FIG. 7 is a flowchart illustrating an example of a process flow of an in-band placement destination determination process according to the first example embodiment;

FIG. 8 is a flowchart illustrating an example of a process flow of an out-of-band placement destination determination process according to the first example embodiment;

FIG. 9A is an explanatory diagram illustrating an operation example of a program in a target system according to a second example embodiment;

FIG. 10A is an explanatory diagram illustrating an example of program information according to the second example embodiment;

FIG. 10B is an explanatory diagram illustrating an example of the program information according to the second example embodiment;

FIG. 10C is an explanatory diagram illustrating an example of the program information according to the second example embodiment;

FIG. 14A is an explanatory diagram illustrating an example of program information according to a third example embodiment;

FIG. 14B is an explanatory diagram illustrating an example of the program information according to the third example embodiment;

FIG. 14C is an explanatory diagram illustrating an example of the program information according to the third example embodiment;

FIG. 14D is an explanatory diagram illustrating an example of the program information according to the third example embodiment;

FIG. 14E is an explanatory diagram illustrating an example of the program information according to the third example embodiment;

DESCRIPTION OF EMBODIMENTS

Figure 1:
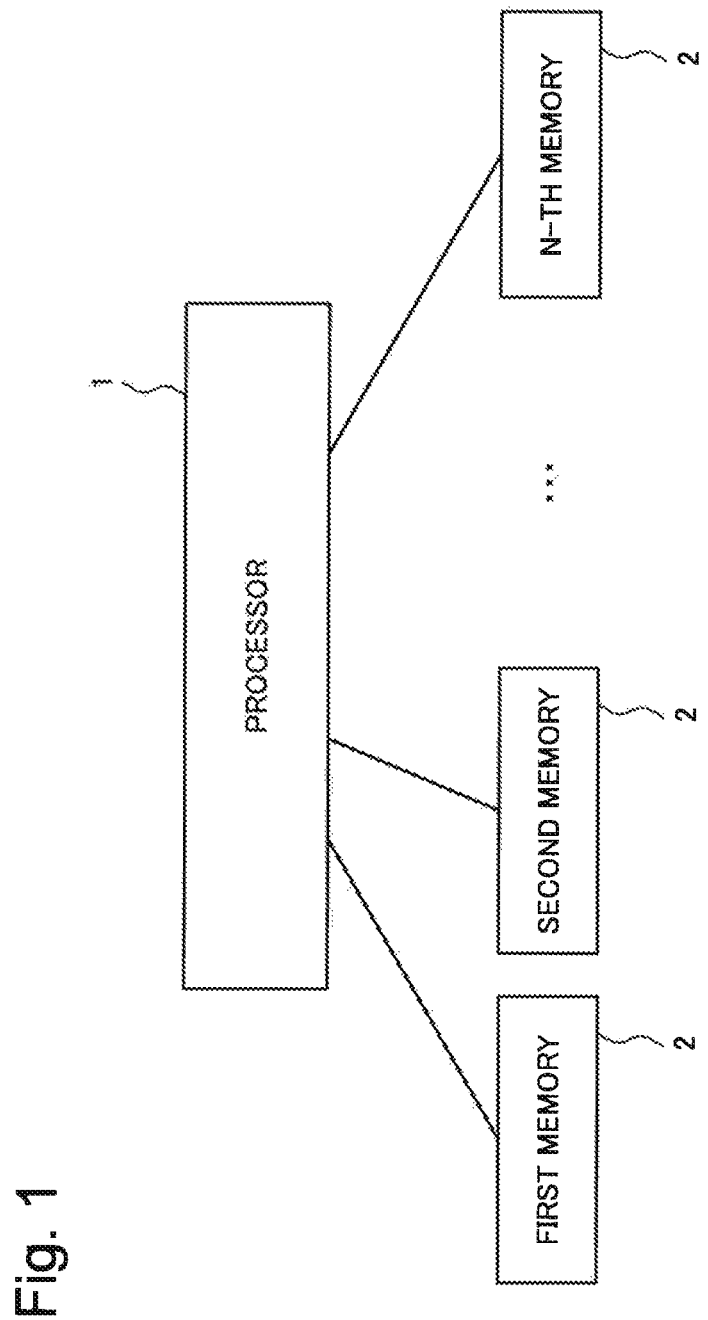
FIG. 1 is a system configuration diagram illustrating an example of a target system.

Example embodiments of the present invention will be described below with reference to the drawings. In the following description, the same elements are denoted by the same reference numerals and repeated explanations may be omitted.

[Description of Target System]

First, a target system used in example embodiments of the present invention will be described. FIG. 1 is a system configuration diagram of an example of a system which is a target to be determined of a placement of data used for a program. As illustrated in FIG. 1, a target system used in example embodiments of the present invention includes a processor 1 and a plurality of memories 2. The processor 1 is connected to each of the memories 2. A mode in which the processor 1 and each of the memories 2 are connected is not particularly limited.

The processor 1 may be a processor capable of executing a plurality of programs simultaneously. In the example embodiments, the term "program" is used to represent a usage unit of the processor, such as a task, a thread, or a process. Examples of the processor 1 include a multi-core processor, a many-core processor, a GPU (Graphic Processing Unit) and the like. However, the processor 1 is not limited to these examples.

Each of the memories 2 is a storage device that stores data. Each of the memories 2 includes a plurality of resource amounts such as a size, a latency, and a bandwidth. The target system illustrated in FIG. 1 includes at least two or more memories having different bandwidth. The target system is, for example, a system having an on-chip memory and a main memory, or may be a system including the processor 1 which is executed by a plurality of pipeline processes.

Figure 2:
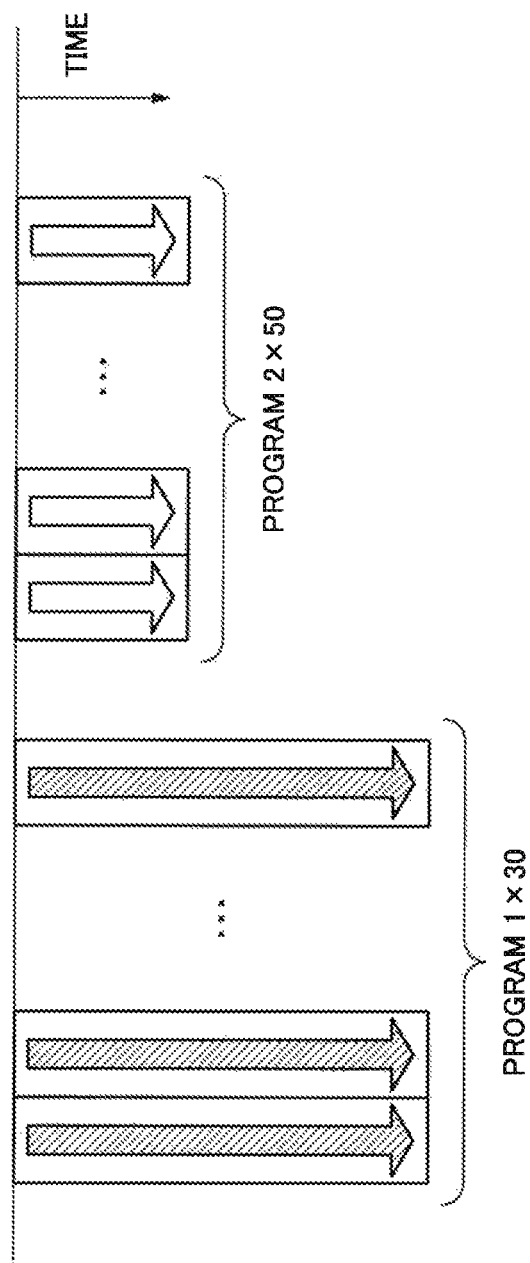
FIG. 2 is an explanatory diagram illustrating an operation example of a program in the target system.

FIG. 2 is an explanatory diagram illustrating an operation example of a program in the target system. As illustrated in FIG. 2, in the target system, a plurality of programs are simultaneously executed. In FIG. 2, shaded arrows and outlined arrows each represent an execution state of a program process. Each block surrounding the arrows represents one execution program. FIG. 2 illustrates an example in which 30 first programs ("program 1" in the figure) are simultaneously executed and 50 second programs ("program 2" in the figure) are simultaneously executed. In this case, the first program and the second program represent the types of programs. From FIG. 2, it can be seen that 80 programs in total are simultaneously executed in a certain period.

In this case, programs which are targets of data placement are programs that can be counted in units of execution and correspond to 80 programs in total in the example of FIG. 2. The term "programs" used in example embodiments of the present invention indicates, unless otherwise noted, programs that can be counted in units of execution.

First Example Embodiment

Next, a first example embodiment of the present invention will be described.

[Description of Configuration]

Figures 3, 4:
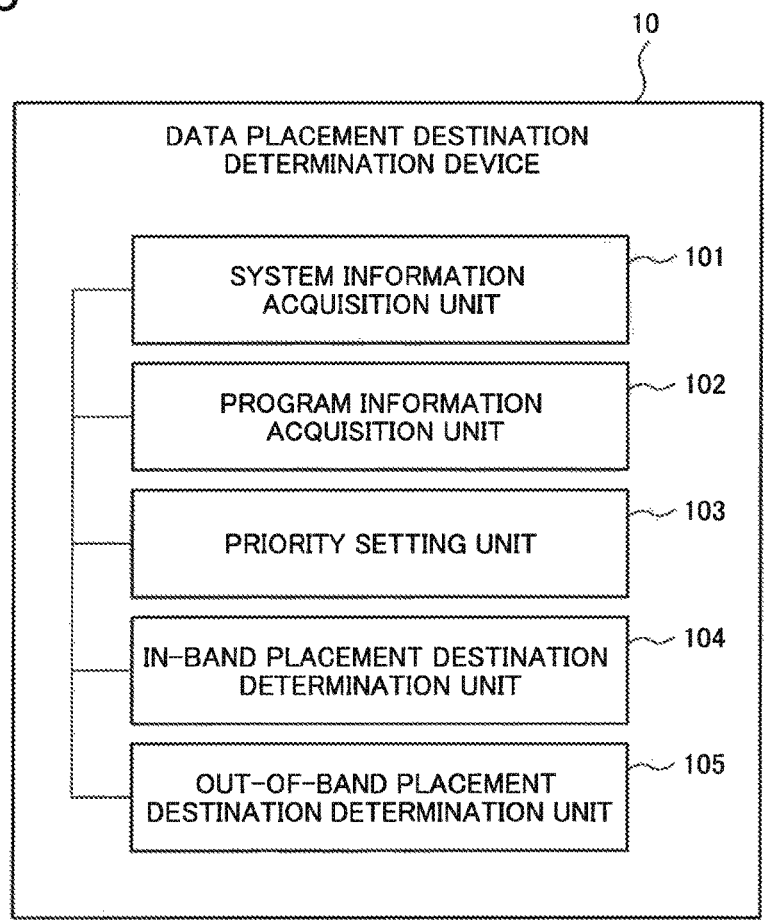
FIG. 3 is a configuration diagram illustrating a configuration example of a data placement destination determination device according to a first example embodiment.
FIG. 4 is an explanatory diagram illustrating an example of system information.

FIG. 3 is a configuration diagram illustrating a configuration example of the data placement destination determination device 10 according to this example embodiment. The data placement destination determination device 10 illustrated in FIG. 3 includes a system information acquisition unit 101, a program information acquisition unit 102, a priority setting unit 103, an in-band placement destination determination unit 104, and an out-of-band placement destination determination unit 105.

An outline of an operation of each of these units is given below. The system information acquisition unit 101 acquires system information which is information about the target system. The system information includes a memory size and a memory bandwidth of each of at least memories which are candidates of data placement destination included in the target system. Note that the system information may include another index related to a memory performance. Hereinafter, at least a memory that is determined to be a candidate of a data placement destination included in the target system may be referred to as a target memory.

FIG. 4 is an explanatory diagram illustrating an example of system information. The example illustrated in FIG. 4 is an example of system information when the target system includes two types of memories ("memory 1" and "memory 2" in the figure) for the placement of data used for a program. As illustrated in FIG. 4, the system information acquisition unit 101 may acquire system information including identification information, a memory size, and a memory bandwidth of each target memory. From FIG. 4, for example, it can be seen that a first memory ("memory 1" in the figure) has a memory size of 10 GB and a memory bandwidth of 300 GB/s. For example, it can also be seen that a second memory ("memory 2" in the figure) has a memory size of 300 GB and a memory bandwidth of 50 GB/s. In this case, the memory bandwidth may be an actual measured value or a theoretical value. Examples of a method for acquiring system information include a method of preparing a GUI (Graphical User Interface) for inputting system information and causing a user to input the system information by using the GUI, and a method of directly loading system information from a target system by using, for example, a function of outputting system information included in the target system, and the like.

Although FIG. 4 illustrates only the information about two types of memories, the system information acquisition unit 101 acquires at least information about the memory size and memory bandwidth of all target memories.

The program information acquisition unit 102 acquires program information which is information about at least a program which is a target to be determined a placement destination of data among programs to be executed in the target system. The program information includes a required size and the required bandwidth for each of at least the programs which is to be determined the placement destination of data among the programs to be executed in the target system. Note that the program information may include another index related to a memory access time during the operation of the programs, particularly, during the execution of the programs. Hereinafter, at least a program which is a target to be determined a placement destination of data among the programs to be executed in the target system may be referred to as a target program.

FIG. 5 is an explanatory diagram illustrating an example of program information. The example illustrated in FIG. 5 is an example of program information acquired for the execution program illustrated in FIG. 2. As illustrated in FIG. 5, the program information acquisition unit 102 may acquire program information including identification information, a required size, a required bandwidth, an execution time, and the number of simultaneous executions for each program code of the target program. The example illustrated in FIG. 5 is an example of program information indicating resource amounts related particularly to an operation of a program which is a target to be determined a placement destination of data. In this case, the required size is a size required for each memory by a program. The required size may be, for example, a total size of data used when a program accesses a memory during the execution of the program. The required bandwidth is a bandwidth required for the placement destination memory by a program. As the required bandwidth, for example, a value designated by a user, a value that is obtained based on a value obtained by measuring the size or frequency of data accessed by the target program during the execution of the program, or a value obtained based on a maximum data access amount (maximum transfer amount of data), an allowable latency during the execution of the target program, or the like may be used. The execution time is a time required from loading of a program until the completion of the program. As the execution time, for example, a logical value of a required time from invocation of a program until the completion of the program, when assuming that the required bandwidth is satisfied, or an actual measured value obtained when a single target program is operated may be used. Note that program information may not include an execution time. The program information may include, instead of an execution time of each program, another index related to a memory access time during the execution of each program.

From FIG. 5, it can be seen that, for example, a required size of the first program ("program 1" in the figure) is 0.5 GB; a required bandwidth of the first program is 3 GB/s; an execution time of the first program is 400 s; and the number of simultaneous executions of the first program is 30. Further, it can be seen that, for example, a required size of the second program ("program 2" in the figure) is 0.5 GB; a required bandwidth of the second program is 2 GB/s; an execution time of the second program is 150 s; and the number of simultaneous executions of the second program is 50. Examples of a method for acquiring program information include a method of preparing a GUI for inputting program information and causing a user to input the program information by using the GUI, and a method of loading information output from a compiler or the like.

The priority setting unit 103 sets a priority for each of the target memories based on the memory bandwidth. Further, the priority setting unit 103 sets a priority based on the required bandwidth for each of the target programs. Hereinafter, the priority set for each memory may be referred to as "memory priority". The priority set for each program may be referred to as "program priority". The priority setting unit 103 may set the memory priority, for example, in a descending order of the memory bandwidth included in the system information. Further, the priority setting unit 103 may set the program priority, for example, in a descending order of the required bandwidth included in the program information.

The in-band placement destination determination unit 104 determines the placement destination of data use for each target program based on the memory priority and the program priority in such a range that the sum of the memory size and the sum of the memory bandwidth used by the target programs after the placement do not exceed the memory size and the memory bandwidth of the placement destination memory. For example, the in-band placement destination determination unit 104 may allocate, for example, data used for a high priority program to a memory in a descending order of memory priority within an allowable range of the memory size and the memory bandwidth. Hereinafter, the placement destination determination process performed by the in-band placement destination determination unit 104 may be referred to as an in-band placement destination determination process.

As a result of the in-band placement destination determination process, when there is a program whose placement destination is undetermined, the out-of-band placement destination determination unit 105 determines, for the program whose placement destination is undetermined, a memory in which an increase in the total execution time of the target programs after placement is minimum to be the placement destination, in a range not exceeding the memory size of each target memory. The out-of-band placement destination determination unit 105 calculates, for example, for each of the placement destination undetermined programs, an increase value of the execution time of each target program when the data used for the target program is placed in each of the data placeable target memories. Further, the out-of-band placement destination determination unit 105 determines a memory with a minimum increase value of the execution time to be the data placement destination.

In this example embodiment, the system information acquisition unit 101 and the program information acquisition unit 102 are implemented by, for example, an information processing device, such as a CPU, which operates according to a program, and various information input devices (such as a network card, a mouse, a keyboard, and a display device). The priority setting unit 103, the in-band placement destination determination unit 104 and the out-of-band placement destination determination unit 105 are implemented by, for example, an information processing device, such as a CPU, which operates according to a program.

[Description of Operation]

Figure 6:
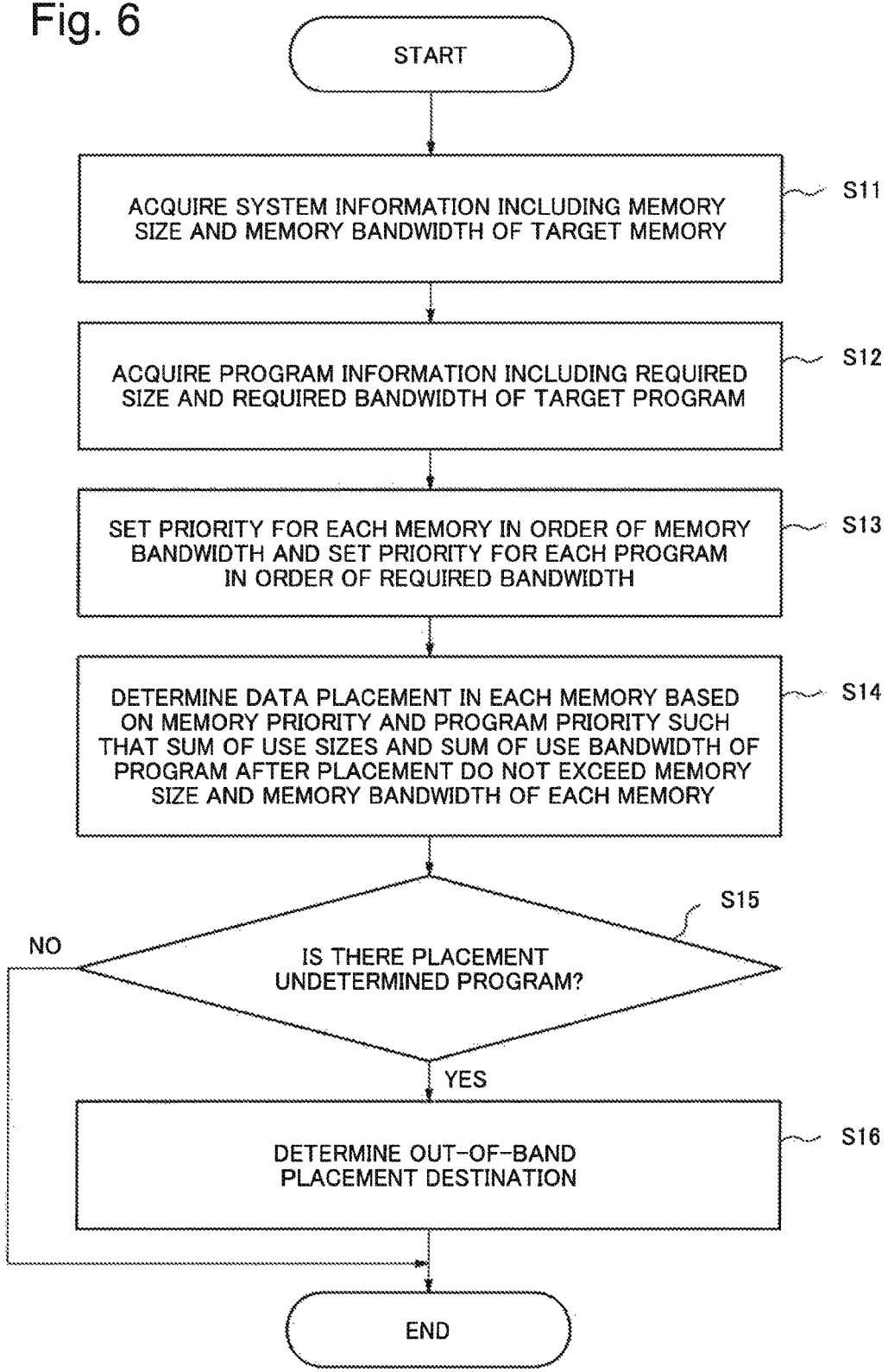
FIG. 6 is a flowchart illustrating an example of an overall operation of the first example embodiment.

Next, an operation of this example embodiment will be described. FIGS. 6 to 8 are flowcharts each illustrating an example of the operation of this example embodiment. FIG. 6 is a flowchart illustrating an example of an overall operation of this example embodiment. FIG. 7 is a flowchart illustrating an example of a process flow of an in-band placement destination determination process performed by the in-band placement destination determination unit 104. FIG. 8 is a flowchart illustrating an example of a process flow of an out-of-band placement destination determination process performed by the out-of-band placement destination determination unit 105.

First, the overall operation will be described with reference to FIG. 6. In the example illustrated in FIG. 6, first, the system information acquisition unit 101 acquires system information including at least a memory size and a memory bandwidth of a target memory (step S11).

Next, the program information acquisition unit 102 acquires program information including at least a required size and a required bandwidth of each target program (step S12). Note that the order of step S11 and step S12 may be reversed, or step S11 and step S12 may be processed in parallel.

Next, the priority setting unit 103 sets a memory priority for each of the target memories based on the memory bandwidth included in the system information, and sets a program priority for each of the target programs based on the required bandwidth included in the program information (step S13). In this case, the priority setting unit 103 sets the memory priority in such a manner that a higher priority is given to a memory with a larger memory bandwidth. Further, the priority setting unit 103 sets the program priority in such a manner that a higher priority is given to a program with a larger required bandwidth.

Next, the in-band placement destination determination unit 104 performs a process of determining an in-band placement destination based on the memory priority, memory size, and memory bandwidth of each target memory and the program priority, required size, and required bandwidth of each target program (step S14). In this case, the in-band placement destination determination unit 104 allocates memories having a higher priority in a descending order of priority of programs in such a manner that the sum of use sizes and the sum of use bandwidth by the target programs in each target memory do not exceed the resource amounts (memory size and memory bandwidth) of each target memory. Note that the process of determining the in-band placement destination will be described in detail later.

As a result of the process of determining the in-band placement destination in step S14, when there is a placement destination undetermined program (Yes in step S15), the out-of-band placement destination determination unit 105 performs a process of determining an out-of-band placement destination on the placement destination undetermined program (step S16). The out-of-band placement destination determination unit 105 may allocate, for example, a memory with a minimum increase value in the execution time of each target program among the target memories in which data is placeable in a descending order of priority of programs among the placement destination undetermined programs. Note that the process of determining the out-of-band placement destination will be described in detail later.

Next, the process of determining the in-band placement destination (step S14 in FIG. 6) performed by the in-band placement destination determination unit 104 will be described with reference to FIG. 7. In the example illustrated in FIG. 7, the in-band placement destination determination unit 104 first selects target memories as placement destination candidates in the order of memory priority (step S141). Hereinafter, the selected target memories are referred to as candidate memories.

Next, the in-band placement destination determination unit 104 selects placement destination undetermined target programs in the order of program priority (step S142). In this case, the in-band placement destination determination unit 104 may select a plurality of target programs having the same program priority. Hereinafter, the selected target programs are referred to as selected programs.

Next, the in-band placement destination determination unit 104 calculates a use size and use bandwidth of data of the selected programs in each candidate memory (step S143). In this case, the required size of each selected program is used as the use size. The required bandwidth of each selected program is used as the use bandwidth. Note that when there is a plurality of selected programs, the sum of required sizes of the selected programs and the sum of required bandwidth of the selected programs may be used as the use size and the use bandwidth. For example, when the in-band placement destination determination unit 104 selects all execution programs of the first program illustrated in FIG. 5, a value obtained by multiplying the number of simultaneous executions (=30) by the required size (=0.5 GB) of the first program may be used as the use size of each selected program. Further, a value obtained by multiplying the number of simultaneous executions (=30) by the required bandwidth (=3 GB/s) of the first program may be used as the use bandwidth of each selected program.

Next, the in-band placement destination determination unit 104 determines whether or not data used for the selected programs are placeable without exceeding the memory size and memory bandwidth of each candidate memory (step S144). In this case, when a candidate memory is set as the placement destination of data used for the selected program, the in-band placement destination determination unit 104 may determine whether or not the sum of use sizes and the sum of use bandwidth by the target programs in the candidate memory exceed the memory size and the memory bandwidth of the candidate memory. The sum of use sizes is more specifically a value obtained by adding the use size by the selected program to the sum of use sizes by the target programs which are currently determined to be placed in the candidate memories. The sum of use bandwidth is more specifically a value obtained by adding the use bandwidth by the selected program to the sum of use bandwidth by the target programs which are currently determined to be placed in the candidate memories.

When it is determined that the data are placeable, specifically, when both of the sum of use sizes and the sum of use bandwidth in each candidate memory do not exceed the resource amounts (memory size and memory bandwidth) of the candidate memory (Yes in step S144), the in-band placement destination determination unit 104 determines the placement destination of data used for the selected program to be the candidate memory (step S145). On the other hand, when at least one of the sum of use sizes and the sum of use bandwidth in each candidate memory exceeds the resource amounts of the candidate memory (No in step S144), the in-band placement destination determination unit 104 determines that the data used for the selected program cannot be placed in the candidate memories.

Even when the in-band placement destination determination unit 104 determines that the data cannot be placed in the determination of step S144, the placement destination of data used for a part of the selected program can be determined to be a candidate memory, as long as both the memory size and the memory bandwidth of the candidate memory are satisfied. For example, for program codes having 100 simultaneous execution program codes, the data placement destination for 60 programs out of the selected programs (100 in total) corresponding to the program code can be set as candidate memories. Note that the number of data that can be placed may be obtained from an allowable use size and an allowable use bandwidth of each candidate memory.

After determination as to whether or not data is placeable, when there is a target program which has not been determined whether or not data is placeable for the candidate memory, the in-band placement destination determination unit 104 returns to step S142 to determine whether or not the target program can be placed. When the determination as to whether or not all target programs can be placed in each candidate memory is completed, the process returns to step S141 to perform a similar process on a target memory with a second highest priority. After a similar process on all target memories is completed, the process of determining the in-band placement destination is terminated.

Next, the process of determining the out-of-band placement destination (step S16 in FIG. 6) performed by the out-of-band placement destination determination unit 105 will be described with reference to FIG. 8. In the example illustrated in FIG. 8, the out-of-band placement destination determination unit 105 first selects placement destination undetermined target programs in the order of program priority (step S161). Hereinafter, the programs selected in this case are referred to as selected programs.

Next, the out-of-band placement destination determination unit 105 selects target memories as placement destination candidates in the order of memory priority (step S162). Hereinafter, the memories selected in this case are referred to as candidate memories.

Next, the out-of-band placement destination determination unit 105 calculates a use size and use bandwidth of data of the selected programs in each candidate memory (step S163). Note that a method for calculating the use size and the use bandwidth may be similar to that in step S143 described above.

Next, the out-of-band placement destination determination unit 105 determines whether or not the data used for the selected programs is placeable without exceeding the memory size of each candidate memory (step S164). In this case, the out-of-band placement destination determination unit 105 may determine whether or not the sum of use sizes by the target programs in each candidate memory does not exceed the memory size of the candidate memory, when the candidate memory is set as the placement destination of the selected programs. Note that a method for calculating the sum of use sizes may be similar to that in step S144 described above.

When it is determined that the data is placeable, i.e., when the sum of use sizes in each candidate memory does not exceeds the resource amounts (memory size) of the candidate memory (Yes in step S164), the out-of-band placement destination determination unit 105 determines that the data used for the selected programs can be placed in each candidate memory and proceeds to step S165.

In step S165, the out-of-band placement destination determination unit 105 calculates an increase value of the execution time of each target program when the candidate memory is set as the placement destination of data used for each of the selected programs. The increase value of the execution time of each target program is information indicating a normalized increase value of a total execution time of programs to be simultaneously executed due to an excess of the memory bandwidth of the placement destination memory which is calculated using the execution time of each target program. Note that a method for calculating an increase value of the execution time will be described later. After calculation of an increase value of the execution time, the out-of-band placement destination determination unit 105 returns to step S162 to determine whether or not data can be placed in the subsequent target memory.

On the other hand, when the sum of use sizes by the target programs in each candidate memory exceeds the resource amount of the candidate memory (No in step S164), the out-of-band placement destination determination unit 105 determines that the data used for the selected programs cannot be placed in the candidate memory, and directly returns to step S162. Even if the resource amount of the candidate memory are insufficient, when the programs whose placement destination is already determined include a program having a priority lower than that of the selected program, the out-of-band placement destination determination unit 105 may replace the data placement destinations of the both programs. Specifically, the out-of-band placement destination determination unit 105 may determine that the data used for the selected programs can be placed in the candidate memory, and may newly add a program having a lower priority in the candidate memory to be replaced to the placement destination undetermined programs. Note that in this case, the out-of-band placement destination determination unit 105 calculates an increase value of the execution time when the candidate memory is set as the placement destination of data used for each of the selected programs, and thus the process may proceed to step S165.

After completion of the determination as to a possibility of data placement for all target memories, and if possible, the calculation of an increase value of the execution time, the out-of-band placement destination determination unit 105 proceeds to step S166. In step S166, the out-of-band placement destination determination unit 105 determines, as the placement destination of data used for each selected program, a target memory having a minimum increase value of the execution time among the target memories that are determined that data is placeable.

If there is another placement destination undetermined target program, the out-of-band placement destination determination unit 105 returns to step S161 to perform a similar process on the target program. Then, after a similar process on all the placement destination undetermined target programs is completed, the process of determining the out-of-band placement destination is terminated.

Next, the method for calculating an increase value of the execution time will be described. In this example embodiment, an increase value of the execution time of each target program is obtained as follows.

$$\text{Increase value of execution time} = \text{memory bandwidth excess degree} \times (\text{sum of execution times of programs when the target memory is set as the data placement destination}) \quad (1)$$

The memory bandwidth excess degree is obtained by normalizing the degree of excess of the use bandwidth of data by the target program for each target memory, and is obtained by, for example, the following expression (2).

$$\text{Memory bandwidth excess degree} = (\text{sum of use bandwidth} \div \text{memory bandwidth}) - 1 \quad (2)$$

Note that the increase value of the execution time in the expression (1) is obtained by normalizing the degree of increase of the total execution time in a target program group which sets the target memory as the placement destination, assuming that a delay according to the bandwidth excess degree occurs every time each target program, data of which are placed in the target memory, makes a memory access, on the premise that the memory access corresponding to the execution time is made by each target program.

Note that the increase value of the execution time may be information serving as an indication of an increased amount of a total execution time of programs to be simultaneously executed due to an excess of the bandwidth of the data placement destination memory, and more specifically, may be information indicating an increase rate of the total execution time according to the total required bandwidth that exceeds the memory bandwidth. The increase value of the execution time may be, for example, a value calculated using another index related to the memory access time during the execution of the program which sets the target memory as the placement destination, other than using the execution time of the program when the target memory is set as the placement destination. Examples of another index related to the memory access time during the execution of each program include the number of target programs which set the target memory as the placement destination, an execution ratio (a ratio at which the target program is executed in a certain period), the number of memory accesses, a memory access frequency, and the like. Note that a combination of a plurality of the above-mentioned indices, such as the execution ratio×the number of memory accesses, can be used for calculation of the increase value of the execution time. Although it is called "increase value of execution time", the increase value of the execution time may be, for example, information that is calculated using information related to the memory bandwidth excess degree and the memory access time during the execution of each program and that indicates a degree of overlap of a memory access by a program in the memory, the bandwidth of which is exceeded.

Further, the out-of-band placement destination determination unit 105 may more simply determine the placement destination memory by using a memory bandwidth excess degree, instead of using the increase value of the execution time. In other words, the out-of-band placement destination determination unit 105 may determine a memory having the smallest memory bandwidth excess degree to be the data placement destination.

As described above, according to this example embodiment, the data placement destination can be determined in such a manner that the required bandwidth for each memory does not exceed the memory bandwidth of the memory, by using information about the memory bandwidth of the memory and information about the bandwidth required for the memory by a program. Even when the required bandwidth exceeds the memory bandwidth of any one of the memories, the data placement destination can be determined so as to minimize the total execution time of programs to be simultaneously executed. Thus, in this example embodiment, the data placement destination is determined for a system including a plurality of memories having different memory bandwidth by using the memory bandwidth and the bandwidth required by each program. Consequently, efficiency of the execution time of programs to be simultaneously executed in a system including a plurality of memories having different memory bandwidth can be improved.

Note that the system information acquisition unit 101 is an example of a system information acquisition unit; the program information acquisition unit 102 is an example of a program information acquisition unit; and the priority setting unit 103 is an example of a priority setting unit. The in-band placement destination determination unit 104 is an example of a first placement destination determination unit, and the out-of-band placement destination determination unit 105 is an example of a second placement destination determination unit.

Second Example Embodiment

Next, a second example embodiment of this example embodiment will be described. In this example embodiment, a data placement destination is determined in units of partial process when a target program is divided into a plurality of partial processes.

Figure 9B:
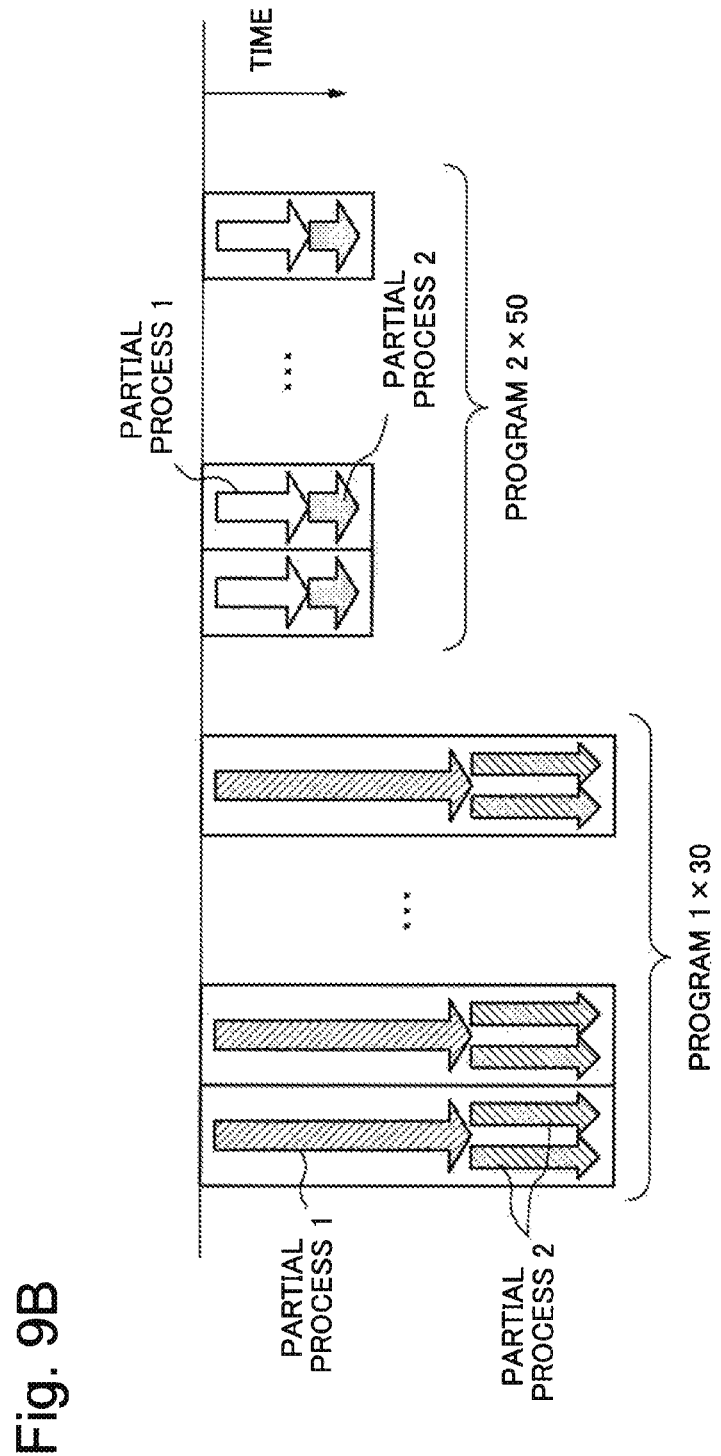
FIG. 9B is an explanatory diagram illustrating an operation example of the program in the target system according to the second example embodiment.

FIGS. 9A and 9B are explanatory diagrams each illustrating an operation example of a program in a target system according to this example embodiment. As illustrated in FIGS. 9A and 9B, also in this example embodiment, a plurality of programs are simultaneously executed in the target system. FIG. 9A illustrates an example in which the number of simultaneous executions of partial processes in both partial processes included in each execution program is 1. FIG. 9B illustrates an example in which the number of simultaneous executions of partial processes in a single partial process ("partial process 2" in the figure) included in each execution program belonging to the first program among the execution programs is 2. Although FIGS. 9A and 9B illustrate an example in which each program is divided into two partial processes, the number of divided partial processes and the number of simultaneous executions of each partial process are not limited to the above examples.

Further, in this example embodiment, partial processes which are targets of data placement are partial processes that can be counted in an execution unit, and are partial processes indicated by each arrow in the example illustrated in FIG. 9B. Hereinafter, the term "partial processes" used in the present invention indicates partial processes that are counted in an execution unit, unless otherwise noted.

[Description of Configuration]

The configuration of this example embodiment is basically similar to that of the first example embodiment. However, the program information acquisition unit 102 according to this example embodiment acquires program information including a required size and a required bandwidth for each partial process of each target program.

FIGS. 10A to 10C are explanatory diagrams each illustrating an example of program information according to this example embodiment. Note that examples illustrated in FIGS. 10A to 10C are examples of program information acquired for the execution program illustrated in FIG. 9A. As illustrated in FIGS. 10A to 10C, the program information acquisition unit 102 according to this example embodiment may acquire program information including an identifier and the number of simultaneous executions for each program code of each target program, and identification information, a required size, a required bandwidth, an execution time, and the number of simultaneous executions for each partial process of each program code. FIG. 10A illustrates an example of information about a program code of each target program in the program information. FIG. 10B illustrates an example of information about a partial process of each target program belonging to the first program ("program 1" in the figure) in the program information. FIG. 10C illustrates an example of information about a partial process of each target program belonging to the second program ("program 2" in the figure) in the program information.

The required size of each partial process is a size required for a memory by a target partial process. As the required size, for example, a total size of data that accesses a memory during the execution of a partial process may be used. The required bandwidth of each partial process is a bandwidth required for a placement destination memory by a target partial process. As the required bandwidth, for example, a value designated by a user, a value obtained based on a value obtained by measuring a size or frequency of data accessed by the target partial process during the execution of the partial process, or a value obtained based on a maximum data access amount (maximum transfer amount), an allowable latency, or the like during the execution of the target partial process may be used. The execution time of each partial process is a time required from reading of the target partial process until completion of the target partial process. As the execution time, for example, a logical value of a time required from the invocation of the target partial process until the completion of the target partial process when assuming that the required bandwidth is satisfied may be used, or an actual measured value obtained when a single target partial process is operated may be used. Also in this example embodiment, the program information may not include the execution time of each partial process. The program information may include another index related to the memory access time during the execution of each partial process, instead of the execution time of each partial process.

For example, FIGS. 10A and 10B shows the following. For example, the number of simultaneous executions of the first program ("program 1" in the figure) is 30, and the first program is divided into two partial processes ("partial process 1" and "partial process 2" in the figure). The required size of the first partial process ("partial process 1" in the figure) of the first program is 0.5 GB; the required bandwidth of the first partial process is 3 GB/s; the execution time of the first partial process is 300 s; and the number of simultaneous executions of the first partial process is 1. The required size of the second partial process ("partial process 2" in the figure) of the first program is 0.1 GB; the required bandwidth of the second partial process is 0.5 GB/s; the execution time of the second partial process is 100 s; and the number of simultaneous executions of the second partial process is 1. Referring to FIGS. 10A and 10C, for example, the number of simultaneous executions of the second program ("program 2" in the figure) is 50, and the second program is divided into two partial processes ("partial process 1" and "partial process 2" in the figure). The required size of the first partial process ("partial process 1" in the figure) of the second program is 0.5 GB; the required bandwidth of the first partial process is 2 GB/s; the execution time of the first partial process is 100 s; and the number of simultaneous executions of the first partial process is 1. The required size of the second partial process ("partial process 2" in the figure) of the second program is 0.3 GB; the required bandwidth of the second partial process is 1 GB/s; the execution time of the second partial process is 50 s; and the number of simultaneous executions of the second partial process is 1.

The priority setting unit 103 sets a priority for each of target memories based on the memory bandwidth, and sets a priority for each partial process of each target program based on the required bandwidth. Hereinafter, the priority set for each partial process may be referred to as a partial process priority.

The in-band placement destination determination unit 104 determines the placement destination of data used for partial processes of the target program based on the memory priority and the partial process priority, in such a range that the sum of primary use sizes and the sum of primary use bandwidth in each partial process of the target program after placement does not exceed the memory size and memory bandwidth of the placement destination memory. The in-band placement destination determination unit 104 may allocate, for example, the data on partial processes with a high partial process priority in order from the memory with a highest memory priority, within an allowable range of the memory size and memory bandwidth.

As a result of the in-band placement destination determination process, when there is a placement destination undetermined partial process, the out-of-band placement destination determination unit 105 determines the placement destination for the placement destination undetermined partial process. Specifically, the out-of-band placement destination determination unit 105 determines the placement destination in a memory having a minimum increase in the total execution time of target programs after placement, in a range not exceeding the memory size of each target memory. The out-of-band placement destination determination unit 105 calculates, for example, for each placement destination undetermined partial process, an increase value of the execution time of each target program when data on the partial process is placed in each target memory in which data is placeable. The out-of-band placement destination determination unit 105 determines a memory having a minimum increase value in the execution time to be the data placement destination.

[Description of Operation]

Figure 11:
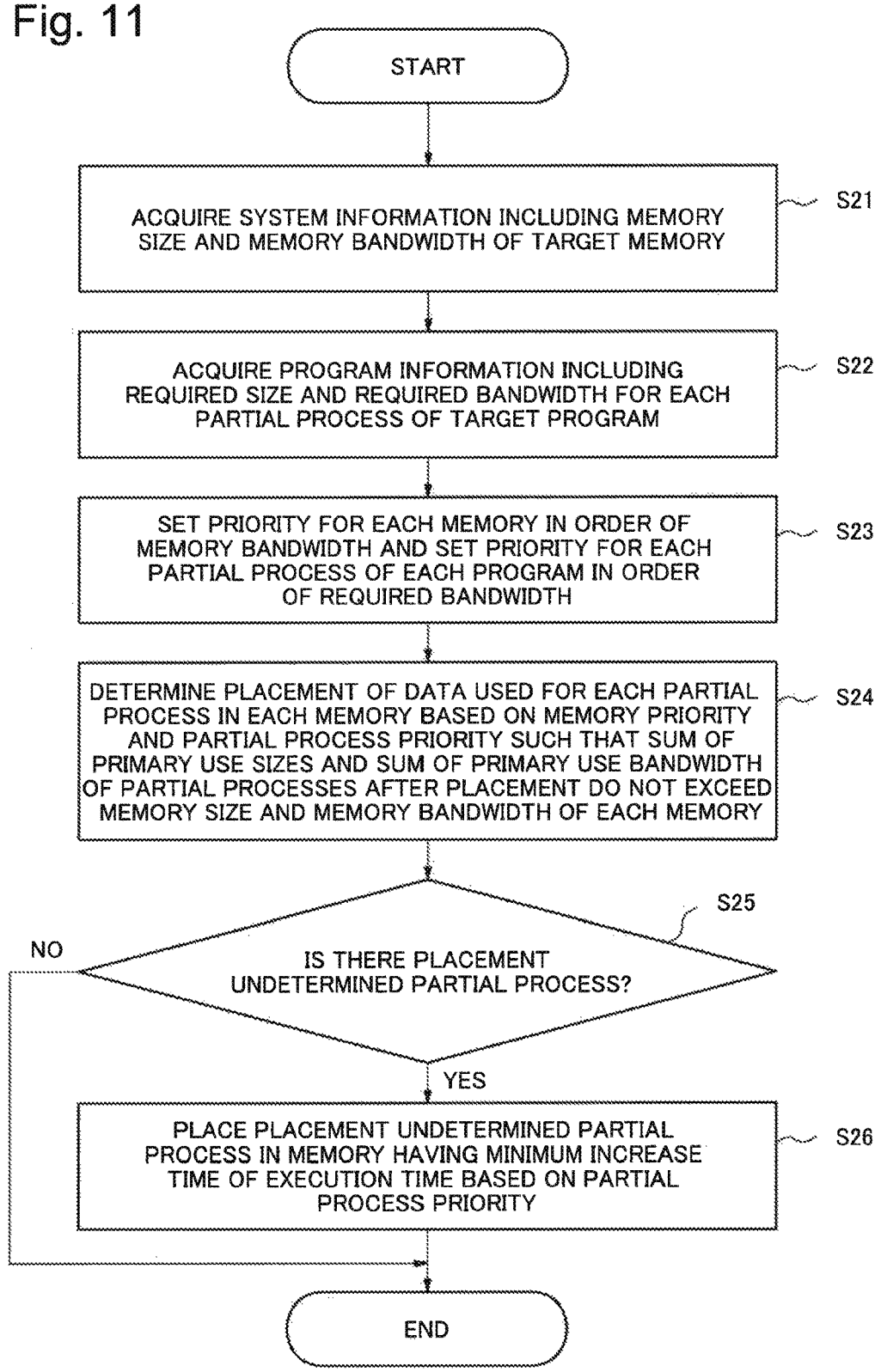
FIG. 11 is a flowchart illustrating an example of an overall operation of the second example embodiment.
Figure 12:
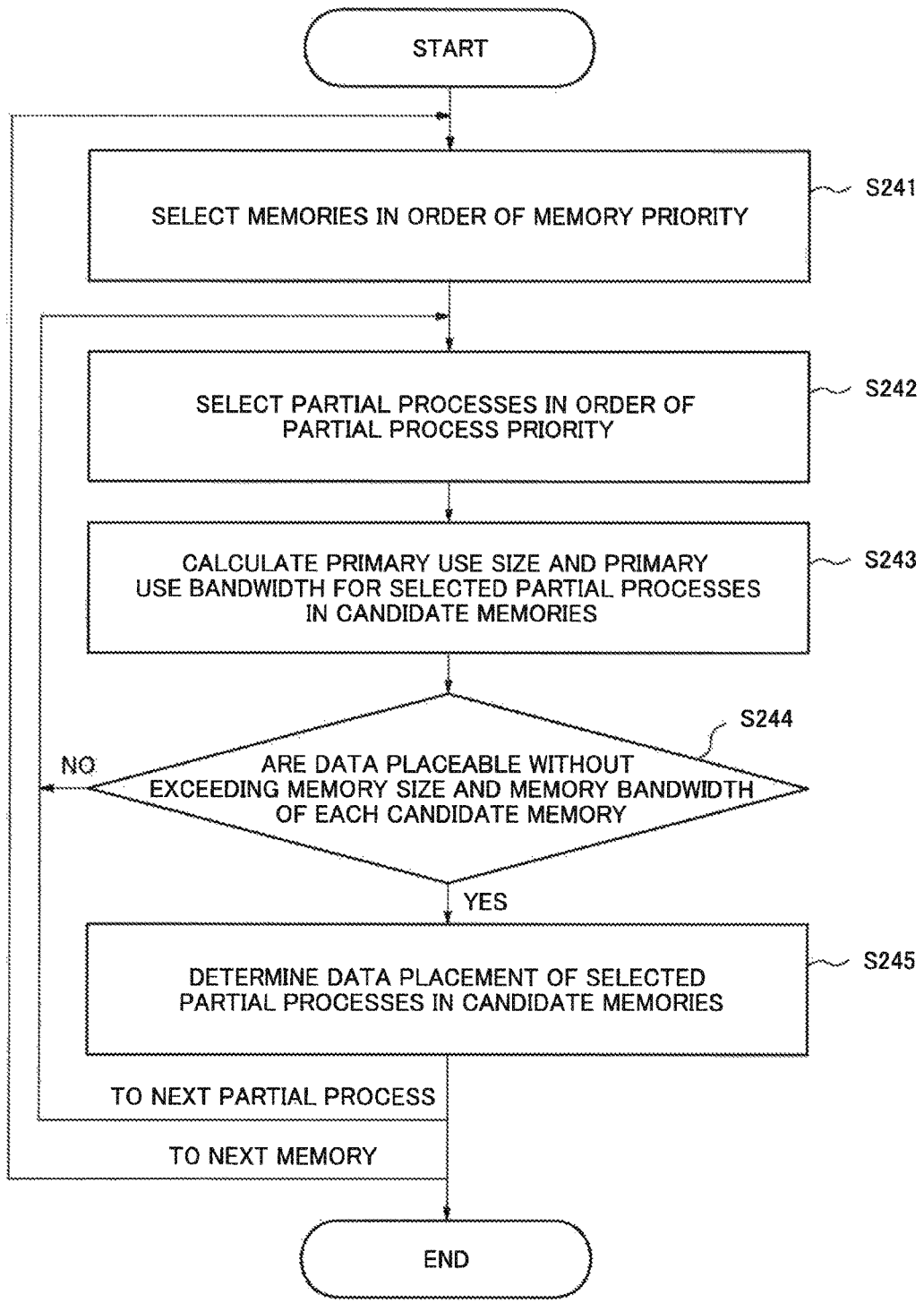
FIG. 12 is a flowchart illustrating an example of a process flow of an in-band placement destination determination process according to the second example embodiment.
Figure 13:
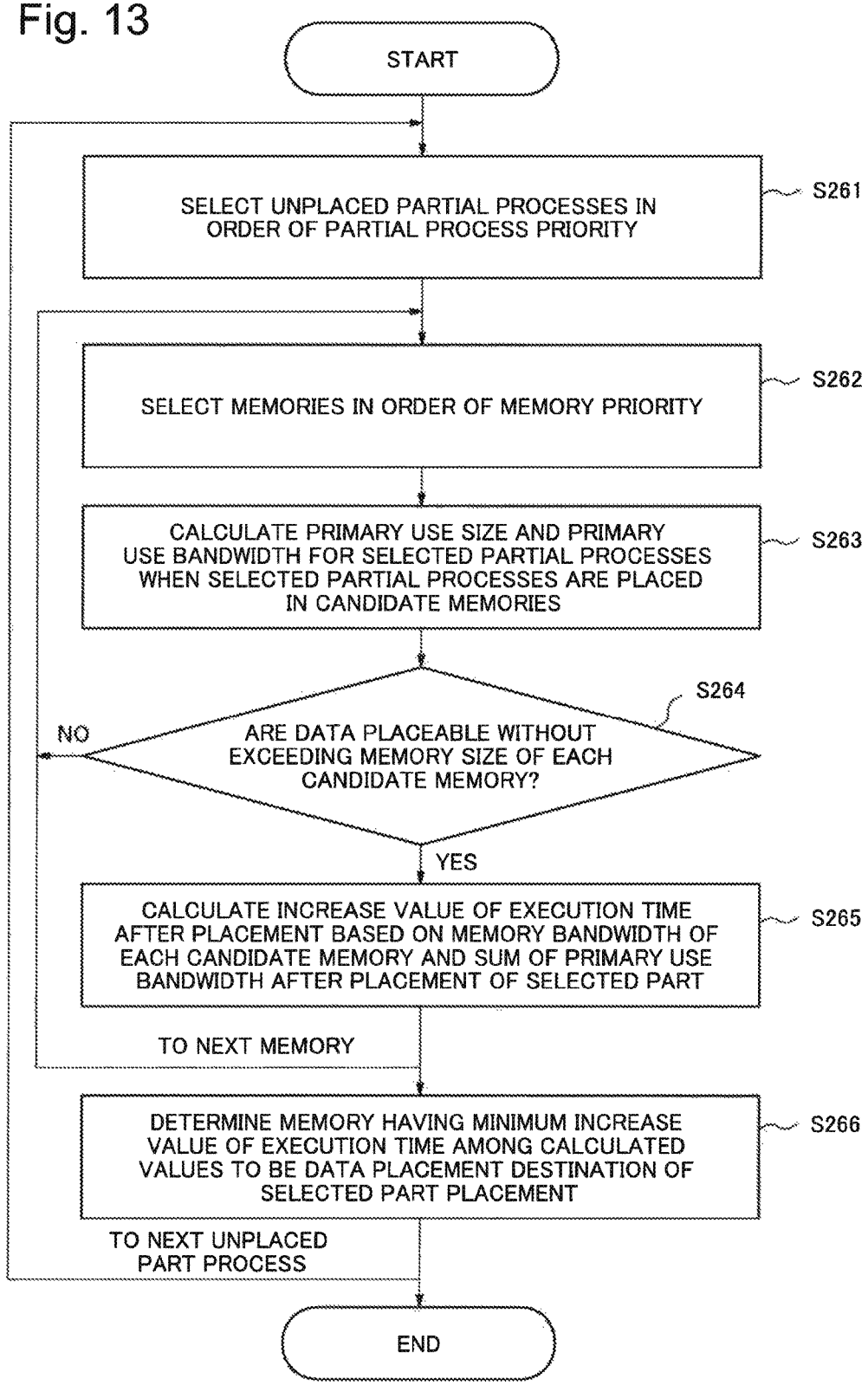
FIG. 13 is a flowchart illustrating an example of a process flow of an out-of-band placement destination determination process according to the second example embodiment.

Next, an operation of this example embodiment will be described. FIGS. 11 to 13 are flowchart each illustrating an example of the operation according to this example embodiment. FIG. 11 is a flowchart illustrating an example of the overall operation according to this example embodiment. FIG. 12 is a flowchart illustrating an example of a process flow of the process of determining the in-band placement destination performed by the in-band placement destination determination unit 104. FIG. 13 is a flowchart illustrating an example of a process flow of the process of determining the out-of-band placement destination performed by the out-of-band placement destination determination unit 105.

Note that the operation of this example embodiment is basically similar to that of the first example embodiment, except that the data placement destination is determined in units of partial process of each target program and the use size and use bandwidth of each target memory and an increase value of the execution time are obtained in consideration of the number of simultaneous executions of each partial process and the belonging target program.

First, the overall operation will be described with reference to FIG. 11. In the example illustrated in FIG. 11, the system information acquisition unit 101 first acquires system information including at least the memory size and memory bandwidth of a target memory (step S21). Note that the operation of step S21 is the same as the operation of step S11 according to the first example embodiment.

Next, the program information acquisition unit 102 acquires program information including at least the required size and required bandwidth for each partial process of each target program (step S22). Note that the order of step S11 and step S12 may be reversed, or step S11 and step S12 may be processed in parallel.

Next, the priority setting unit 103 sets a memory priority for each target memory based on the memory bandwidth included in the system information, and sets a partial process priority for each partial process of each target program based on the required bandwidth of each partial process included in the program information (step S23). The priority setting unit 103 sets the memory priority in such a manner that a higher priority is given to a memory having a larger memory bandwidth. Further, the priority setting unit 103 sets the partial process priority in such a manner that a higher priority is given to a partial process having a larger required bandwidth.

Next, the in-band placement destination determination unit 104 performs a process of determining an in-band placement destination based on the memory priority, memory size, and memory bandwidth of each target memory, and the partial process priority, required size, and required bandwidth of each partial process of each target program (step S24). In this case, the in-band placement destination determination unit 104 allocates memories having a higher priority in a descending order of priority of partial process in such a manner that the sum of primary use sizes and the sum of primary use bandwidth of each partial process of each target program in each target memory do not exceed the resource amounts (memory size and memory bandwidth) of each target memory. Note that the in-band placement destination determination process will be described in detail later.

As a result of the process of determining the in-band placement destination in step S14, when there is a placement destination undetermined part (Yes in step S25), the out-of-band placement destination determination unit 105 performs a process of determining an out-of-band placement destination on the placement destination undetermined partial process (step S26). The out-of-band placement destination determination unit 105 may allocate a memory having a minimum increase value of the execution time of each target program among the target memories in which data are placeable, for example, in a descending order of priority of partial process among the placement destination undetermined partial processes. Note that the process of determining the out-of-band placement destination will be described in detail later.

Next, the in-band placement destination determination process performed by the in-band placement destination determination unit 104 according to this example embodiment will be described with reference to FIG. 12 (step S24 in FIG. 11). In the example illustrated in FIG. 12, the in-band placement destination determination unit 104 first selects target memories as placement destination candidates in the order of memory priority (step S241). Hereinafter, the target memories selected in this case are referred to as candidate memories.

Next, the in-band placement destination determination unit 104 selects placement destination undetermined partial processes in the order of partial process priority (step S242). In this case, when the placement destination undetermined partial processes are simultaneously executed, the in-band placement destination determination unit 104 selects each of the placement destination undetermined partial processes as one partial process. The in-band placement destination determination unit 104 selects, for example, a certain partial process A which is executed as the first partial process for the target program A, or a certain partial process B which is executed as the first partial process for the target program B. Note that the in-band placement destination determination unit 104 may select a plurality of partial processes having the same priority (i.e., the same required bandwidth), such as all partial processes to be executed as the first partial processes for 30 target programs belonging to the first program. Hereinafter, the partial processes selected in this case are referred to as selected partial processes.

Next, the in-band placement destination determination unit 104 calculates the primary use size and the primary use bandwidth of data on the selected partial processes in each candidate memory (step S243). In this case, the required size of each selected partial process is used as the primary use size. As the primary use bandwidth, the required bandwidth of the selected partial process is used. When there are a plurality of selected partial processes, the sum of required sizes and the sum of required bandwidth of the selected partial processes may be used as the primary use size and the primary use bandwidth, respectively. For example, when the in-band placement destination determination unit 104 selects all partial processes to be executed as the first partial process of the first program illustrated in FIGS. 10A and 10B, a value obtained by multiplying the number of simultaneous executions (=1) of the first partial process by the required size (=0.5 GB) of the first partial process of the first program may be used as the primary use size of each selected partial process. As the primary use bandwidth, a value obtained by multiplying the number of simultaneous executions (=1) of the first partial process and the selected number of execution programs (=50) by the required bandwidth (=3 GB/s) of the first partial process of the first program may be used.

Next, the in-band placement destination determination unit 104 determines whether or not data on the selected partial processes can be placed without exceeding the memory size and memory bandwidth of each candidate memory (step S244). In this case, the in-band placement destination determination unit 104 may determine whether or not the sum of primary use sizes and the sum of primary use bandwidth of each partial process in each candidate memory when the candidate memory is set as the placement destination of each selected partial process exceed the memory size and memory bandwidth of each candidate memory. More specifically, the sum of primary use sizes is a value obtained by adding the use size of each selected partial process to the sum of use sizes by each partial process which is currently determined to be placed in each candidate memory. More specifically, the sum of primary use bandwidth is a value obtained by adding the primary use bandwidth of each selected partial process to the sum of primary use bandwidth of each partial process which is currently determined to be placed in each candidate memory. However, when another partial process in the same program is included in each candidate memory, only the use bandwidth of a partial process having the largest required bandwidth is to be added for the sum of primary use bandwidth.

For example, when assuming that a first partial process (required bandwidth=3.0 Gb/s) of one target program (target program A) belonging to the first program illustrated in FIG. 9A and a second partial process (required bandwidth=0.5 GB/s) of the same target program (target program A) are placed in the same memory, the following value is added as the use bandwidth. In other words, only the use bandwidth of the first partial process having the largest required bandwidth among the partial processes of the target program A which sets the memory as the placement destination (in this case, the required bandwidth of the partial process×the number of simultaneous executions of the partial process) is added as the use bandwidth. This is because the first partial process and the second partial process are not simultaneously executed in one target program.

The subsequent processes are similar to those in the process of determining the in-band placement destination according to the first example embodiment, except that the data placement destination is determined in units of partial process of each target program.

Next, the process of determining the out-of-band placement destination performed by the out-of-band placement destination determination unit 105 according to this example embodiment will be described with reference to FIG. 13. In the example illustrated in FIG. 13, the out-of-band placement destination determination unit 105 first selects placement destination undetermined partial processes in the order of priority of partial processes (step S261). In this case, the out-of-band placement destination determination unit 105 selects, as one partial process, for example, a partial process of each target program, such as a first partial process of a target program A, or a first partial process of a target program B. Note that the out-of-band placement destination determination unit 105 may select a plurality of placement destination undetermined partial processes having the same priority (i.e., the same required bandwidth), such as first partial processes for 30 target programs belonging to the first program. Hereinafter, the partial processes selected in this case are referred to as selected partial processes.

Next, the out-of-band placement destination determination unit 105 selects target memories as placement destination candidates in the order of memory priority (step S262). Hereinafter, the memories selected in this case are referred to as candidate memories.

Next, the out-of-band placement destination determination unit 105 calculates the primary use size and the primary use bandwidth of data on the selected partial processes in each candidate memory (step S263). Note that a method for calculating the primary use size and the primary use bandwidth is similar to that of step S243 described above.

Next, the out-of-band placement destination determination unit 105 determines whether or not data on the selected partial processes can be placed without exceeding the memory size of each candidate memory (step S264). In this case, when the candidate memory is set as the placement destination of each selected partial process, the out-of-band placement destination determination unit 105 may determine whether or not the sum of primary use sizes of each partial process in each candidate memory exceeds the memory size of the candidate memory. Note that a method for calculating the sum of primary use sizes is similar to that of step S244 described above.

When it is determined that the data are placeable, i.e., when the sum of primary use sizes in each candidate memory does not exceed the resource amount (memory size) of the candidate memory (Yes in step S264), the out-of-band placement destination determination unit 105 determines that the data on the selected partial processes can be placed in each candidate memory, and proceeds to step S265.

In step S265, the out-of-band placement destination determination unit 105 calculates an increase value of the execution time of each target program when the candidate memory is set as the data placement destination of the selected partial process. In this example embodiment, an increase value of the execution time of each target program is calculated using the above-mentioned memory bandwidth excess degree and the execution time of each partial process. Note that the method for calculating the increase value of the execution time according to this example embodiment will be described later.

The subsequent processes are similar to those in the first example embodiment, except that the data placement destination is determined in units of partial process of each target program.

Next, a method for calculating an increase value of an execution time according to this example embodiment will be described. In this example embodiment, an increase value of the execution time of each target program is obtained as follows.

Increase value of the execution time=memory bandwidth excess degree×(sum of execution times of partial processes which set the target memory as the data placement destination) (3)

In this case, the memory bandwidth excess degree according to this example embodiment is obtained by normalizing the degrees of excess of the primary use bandwidth of data on each partial process of the target program in the target memory, and is obtained by the following expression (4).

Memory bandwidth excess degree=(sum of primary use bandwidth÷memory bandwidth)−1 (4)

Also in this example embodiment, not only the execution time of each partial process, but also, for example, another index related to the memory access time during the execution of each partial process in the placement destination memory, may be used for calculation of the increase value of the execution time. Examples of another index related to the memory access time during the execution of each partial process in the placement destination memory include the maximum number of partial processes to be simultaneously executed in the target memory, an execution ratio of each partial process in the target memory, the number of memory accesses, a memory access frequency, and the like. Note that a combination of a plurality of the above-mentioned indices, such as the execution ratio of each partial process×the number of memory accesses, can also be used for calculation of the increase value of the execution time.

As described above, according to this example embodiment, the use of information for each partial process of a program makes it possible to determine the data placement in units of finer partial process, thereby improving efficiency of the execution time of programs to be simultaneously executed in a system including a plurality of memories having different memory bandwidth.

Third Example Embodiment

Next, a third example embodiment of this example embodiment will be described. In this example embodiment, when a target program is divided into a plurality of partial processes, the placement destination of data is determined in units of partial process, or in units of variable used in each partial process.

[Description of Configuration]

The configuration of this example embodiment is basically similar to that of the first and second example embodiments. However, the program information acquisition unit 102 according to this example embodiment acquires program information including a required bandwidth for each partial process of each target program and information about a variable to be accessed (variable access information).

FIGS. 14A to 14E are explanatory diagrams illustrating an example of program information according to this example embodiment. The program information acquisition unit 102 according to this example embodiment may acquire, for example, program information including the identifier and the number of simultaneous executions for each program code of the target program, the identification information, required bandwidth, execution time, the number of simultaneous executions, and access variable for each partial process of each program code, and the identification information and size for each variable used for each program, as illustrated in FIGS. 14A to 14E.

FIG. 14A illustrates an example of information about a program code of each target program in the program information. FIG. 14B illustrates an example of information about a partial process of each target program belonging to the first program ("program 1" in the figure) in the program information. FIG. 14C illustrates an example of information about a variable used in a target program belonging to the first program in the program information. FIG. 14D illustrates an example of information about a partial process of each target program belonging to the second program ("program 2" in the figure) in the program information. FIG. 14E illustrates an example of information about a variable used in a target program belonging to the second program in the program information. Hereinafter, the information indicating an access variable for each partial process of each target program and the variable size thereof may be referred to as variable access information. Also in this example embodiment, the program information may not include the execution time of each partial process. The program information may include another index related to the memory access time during the execution of each partial process, instead of the execution time of each partial process.

For example, FIGS. 14B and 14C show the following. For example, two variables ("variable 1" and "variable 2" in the figure) are used in the first partial process ("partial process 1" in the figure) of the first program ("program 1" in the figure). Further, one variable ("variable 2" in the figure) is used in the second partial process ("partial process 2" in the figure) of the first program. Among the variables used in the first partial process and the second partial process of the first program, the size of the first variable ("variable 1" in the figure) is 0.4 GB, and the size of the second variable ("variable 2" in the figure) is 0.1 GB. FIGS. 14D and 14E show the following. For example, two variables ("variable 1" and "variable 2" in the figure) are used in the first partial process ("partial process 1" in the figure) of the second program ("program 2" in the figure), and one variable ("variable 2" in the figure) is used in the second partial process ("partial process 2" in the figure) of the second program. Among the variables used in the first partial process and the second partial process of the second program, the size of the first variable ("variable 1" in the figure) is 0.2 GB and the size of the second variable ("variable 2" in the figure) is 0.3 GB.

The other respects are basically similar to those of the second example embodiment.

[Description of Operation]

Figure 15:
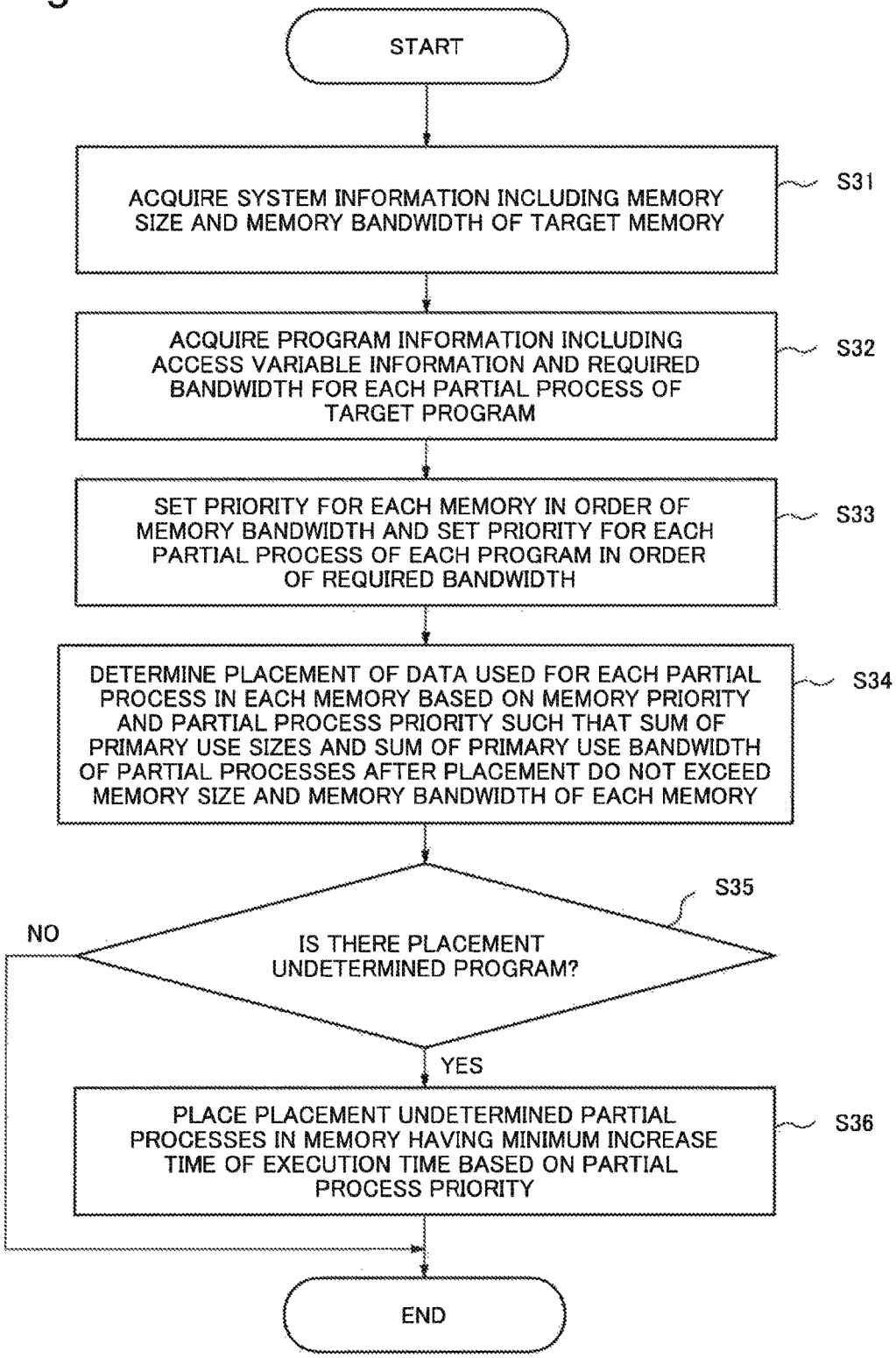
FIG. 15 is a flowchart illustrating an example of an overall operation of the third example embodiment.
Figure 16:
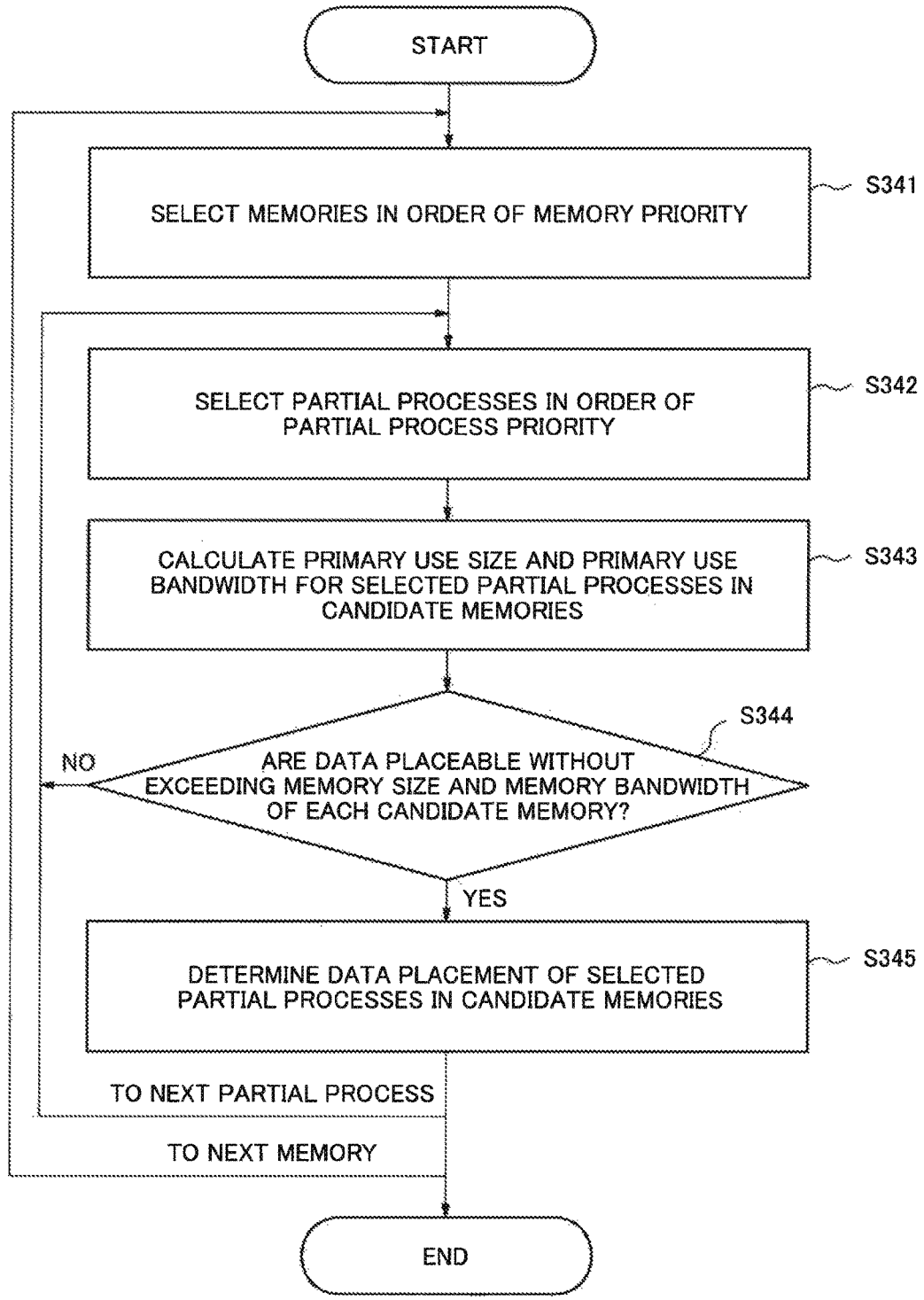
FIG. 16 is a flowchart illustrating an example of a process flow of an in-band placement destination determination process according to the third example embodiment.
Figure 17:
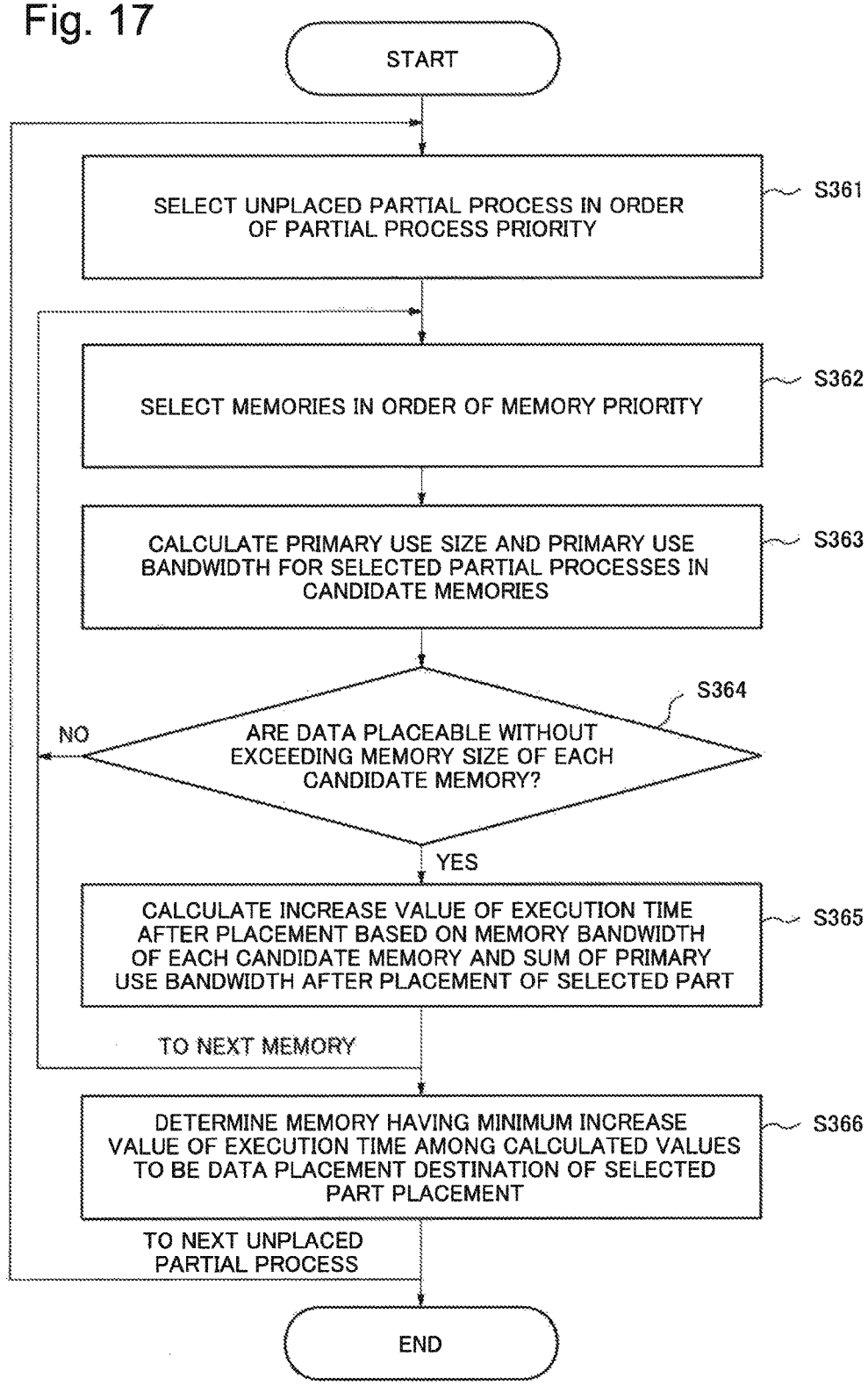
FIG. 17 is a flowchart illustrating an example of a process flow of an out-of-band placement destination determination process according to the third example embodiment.

Next, an operation of this example embodiment will be described. FIGS. 15 to 17 are flowcharts each illustrating an example of the operation of this example embodiment. FIG. 15 is a flowchart illustrating an example of an overall operation of this example embodiment. FIG. 16 is a flowchart illustrating an example of a process flow of the process of determining the in-band placement destination performed by the in-band placement destination determination unit 104. FIG. 17 is a flowchart illustrating an example of a process flow of the process of determining the out-of-band placement destination performed by the out-of-band placement destination determination unit 105.

Note that the operation of this example embodiment is basically similar to that of the second example embodiment, except that the method for calculating the sum of use sizes is different from the second example embodiment.

First, the overall operation will be described with reference to FIG. 15. In the example illustrated in FIG. 15, the system information acquisition unit 101 first acquires system information including a memory size and a memory bandwidth of a target memory (step S31). Note that the operation of step S31 is the same as the operation of step S21 according to the second example embodiment.

Next, the program information acquisition unit 102 acquires program information including a required bandwidth and variable access information for each partial process of each target program (step S32). Note that the order of step S31 and step S32 may be reversed, or step S31 and step S32 may be executed in parallel.

Next, the priority setting unit 103 sets a memory priority for each target memory based on the memory bandwidth included in the system information, and sets a partial process priority for each partial process of each target program based on the required bandwidth of each partial process included in the program information (step S33). Note that the operation of step S33 is the same as the operation of step S23 according to the second example embodiment.

Next, the in-band placement destination determination unit 104 performs a process of determining an in-band placement destination based on the memory priority, memory size, and memory bandwidth of each target memory, and the partial process priority, required size, and required bandwidth of each partial process of each target program (step S34). In this case, the in-band placement destination determination unit 104 allocates memories having a higher priority in a descending order of priority of partial process, in such a manner that the sum of primary use sizes and the sum of primary use bandwidth of each partial process of each target program in each target memory do not exceed the resource amounts (memory size and memory bandwidth) of each target memory. Note that the process of determining the in-band placement destination will be described in detail later.

As a result of the process of determining the in-band placement destination in step S14, when there is a placement destination undetermined partial process (Yes in step S35), the out-of-band placement destination determination unit 105 performs a process of determining an out-of-band placement destination on the placement destination undetermined partial process (step S36). The out-of-band placement destination determination unit 105 may allocate a memory having a minimum increase value of the execution time of each target program among the target memories in which data are placeable, in a descending order of priority of partial process among the placement destination undetermined partial processes. Note that the process of determining the out-of-band placement destination will be described in detail later.

Next, the process of determining the in-band placement destination performed by the in-band placement destination determination unit 104 according to this example embodiment will be described with reference to FIG. 16 (step S34 in FIG. 15). In the example illustrated in FIG. 16, the in-band placement destination determination unit 104 first selects target memories as placement destination candidates in the order of memory priority (step S341). Note that the operation of step S341 may be similar to that of step S241 according to the second example embodiment. Hereinafter, the target memories selected in this case are referred to as candidate memories.

Next, the in-band placement destination determination unit 104 selects placement destination undetermined partial processes in the order of partial process priority (step S342). Note that the operation of step S342 may be similar to that of step S242 according to the second example embodiment. Hereinafter, the partial processes selected in this case are referred to as selected partial processes.

Next, the in-band placement destination determination unit 104 calculates a primary use size and a primary use bandwidth of data on the selected partial processes in each candidate memory (step S343). In this case, the sum of variable sizes of variables used in each selected partial process is used as the primary use size. When there are a plurality of selected partial processes, the sum of variable sizes used in the selected partial processes may be used as the primary use size. However, the variable size of a variable that is used repeatedly in the same target program is added only once. Note that the primary use bandwidth may be similar to that of the second example embodiment.

Next, the in-band placement destination determination unit 104 determines whether or not data on the selected partial processes can be placed without exceeding the memory size and memory bandwidth of each candidate memory (step S344). In this case, the in-band placement destination determination unit 104 may determine whether or not the sum of primary use sizes and the sum of primary use bandwidth of each partial process in each candidate memory when the candidate memory is set as the placement destination of each selected partial process exceed the memory size and memory bandwidth of each candidate memory. More specifically, the sum of primary use sizes is a value obtained by adding the use size of each selected partial process to the sum of use sizes by the partial processes which are currently determined to be placed in the candidate memories. However, as for the sum of primary use sizes, when the candidate memories include another partial process in the same program sharing variables with the selected partial processes, the primary use size of the selected partial processes for the variables is added as zero. Note that the sum of primary use bandwidth may be similar to that of the second example embodiment.

Even when the in-band placement destination determination unit 104 determines that the data cannot be placed in the determination of step S344, the data placement destination for some of the variables used in the selected partial processes may be determined to be the candidate memories, as long as both the memory size and the memory bandwidth of each candidate memory are satisfied. At this time, the use size and the use bandwidth of each variable in each candidate memory may be used instead of the primary use size and the primary use bandwidth of each partial process in each candidate memory, respectively. Note that the variable size may be used as the use size of each variable. The required bandwidth of a partial process having the largest required bandwidth among the partial processes using the variables may be used as the use bandwidth of each variable. Also in this case, when the sum of primary use sizes and the sum of primary use bandwidth in each target memory are obtained, a process for setting the use size of the variable to zero, or setting the use bandwidth of the variable to zero may be performed depending on whether or not there is another partial process in the same program.

The subsequent process is similar to that of the in-band placement destination determination process according to the second example embodiment.

Next, an out-of-band placement destination determination process performed by the out-of-band placement destination determination unit 105 will be described with reference to FIG. 17. In the example illustrated in FIG. 17, the out-of-band placement destination determination unit 105 first selects a placement destination undetermined partial process in the order of priority of partial processes (step S361). Note that the operation of step S361 may be similar to that of step S261 according to the second example embodiment. Hereinafter, the partial process selected in this case is referred to as a selected partial process.

Next, the out-of-band placement destination determination unit 105 selects target memories as placement destination candidates in the order of memory priority (step S362). Note that the operation of step S362 may be similar to that of step S262 according to the second example embodiment. Hereinafter, the memories selected in this case are referred to as candidate memories.

Next, the out-of-band placement destination determination unit 105 calculates a primary use size and a primary use bandwidth of data on the selected partial processes in each candidate memory (step S363). Note that a method for calculating the primary use size and the primary use bandwidth is similar to that of step S343 described above.

Next, the out-of-band placement destination determination unit 105 determines whether or not data for the selected partial process can be placed without exceeding the memory size of each candidate memory (step S364). In this case, when a candidate memory is set as the placement destination of each selected partial process, the out-of-band placement destination determination unit 105 may determine whether or not the sum of primary use sizes of each partial process in the candidate memory exceeds the memory size of the candidate memory. Note that a method for calculating the sum of primary use sizes is similar to that of step S344 described above.

The subsequent processes are similar to those in the process of determining the out-of-band placement destination according to the second example embodiment.

An example in which the data placement destination is determined in units of partial process of each target program has been described above. Alternatively, the data placement destination may be determined in units of variable used in each target program. In that case, a part that is processed in units of partial process in each operation illustrated in FIGS. 15 to 17 may be directly processed in units of variable. At this time, the priority setting unit 103 may determine a priority of variables depending on the required bandwidth of a partial process having the largest required bandwidth among partial processes using the variables. Further, the in-band placement destination determination unit 104 and the out-of-band placement destination determination unit 105 may use the use size and the use bandwidth of selected variables in each candidate memory as the variable size of each selected variable and the required bandwidth of a partial process having the largest required bandwidth among the partial processes using the selected variables. Also in this case, when the sum of primary use sizes and the sum of primary use bandwidth in each target memory are obtained, a process for setting the use size of each variable to zero, or setting the use bandwidth of each variable to zero is performed depending on whether or not there is another partial process in the same program.

As described above, according to this example embodiment, in addition to the advantageous effects of the first and second example embodiments, a more effective data placement can be achieved by using the variable access information and required bandwidth for each partial process.

Although not illustrated in each of the example embodiments described above, the data placement destination determination device according to each example embodiment may include an output device that outputs information indicating a determination result of a placement destination. In this case, the output device may output, for example, the increase value of the execution time calculated for each target memory when the placement is determined, as well as the information indicating the determination result of the placement destination. At this time, the output unit may output, as zero, the increase value of the execution time of a target memory, the bandwidth of which is not exceeded.

For example, the user may provide the data placement destination determination device with system information about systems used before and after the addition of memories, and may acquire result information including the determination result of the placement destination in each system and the increase value of the execution time calculated for each target memory. A result of comparing the sums of the increase values of the execution time of each memory may be used as an indication of an increase or decrease in the execution time of each service program when memories having different memory bandwidth are added. Thus, for example, the user can easily obtain a suitable configuration for a user system after a system environment is changed.

Fourth Example Embodiment

Figure 18:
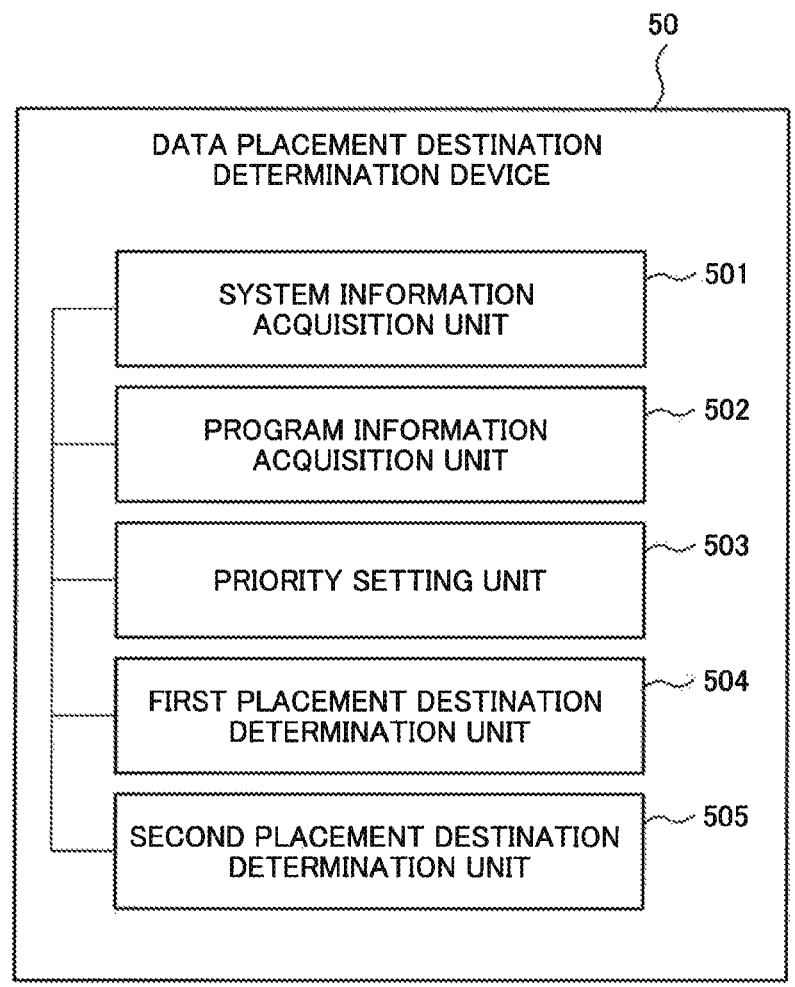
FIG. 18 is a block diagram illustrating a configuration example of a data placement destination determination device according to a fourth example embodiment.

FIG. 18 is a block diagram illustrating a configuration of a data placement destination determination device 50 according to a fourth example embodiment of the present invention. As illustrated in FIG. 18, the data placement destination determination device 50 according to the fourth example embodiment includes a system information acquisition unit 501, a program information acquisition unit 502, a priority setting unit 503, a first placement destination determination unit 504, and a second placement destination determination unit 505.

The system information acquisition unit 501 acquires a memory bandwidth and a memory size of each candidate memory which is a candidate for a placement destination of data used for a target program.

The program information acquisition unit 502 acquires a required bandwidth and a required size of each memory for each target program.

The priority setting unit 503 sets a priority for each target program based on the required bandwidth, and sets a priority for each candidate memory based on the memory bandwidth.

The first placement destination determination unit 504 determines a placement destination of data used for each target program among the candidate memories based on the priorities set by the priority setting unit 503, in a range not exceeding the memory size and memory bandwidth of each candidate memory.

The second placement destination determination unit 505 determines a placement destination of a placement destination undetermined program whose placement destination is not determined by the first placement destination determination unit 504, based on the priority of the placement destination undetermined program, the required bandwidth of each target program, and the memory bandwidth of each candidate memory, in a range not exceeding the memory size of each candidate memory.

The present invention includes at least the above-described configuration of this example embodiment, thereby improving efficiency of the execution time of programs to be executed in a system in which a plurality of memories having different memory bandwidth are incorporated.

Fifth Example Embodiment

Figure 19:
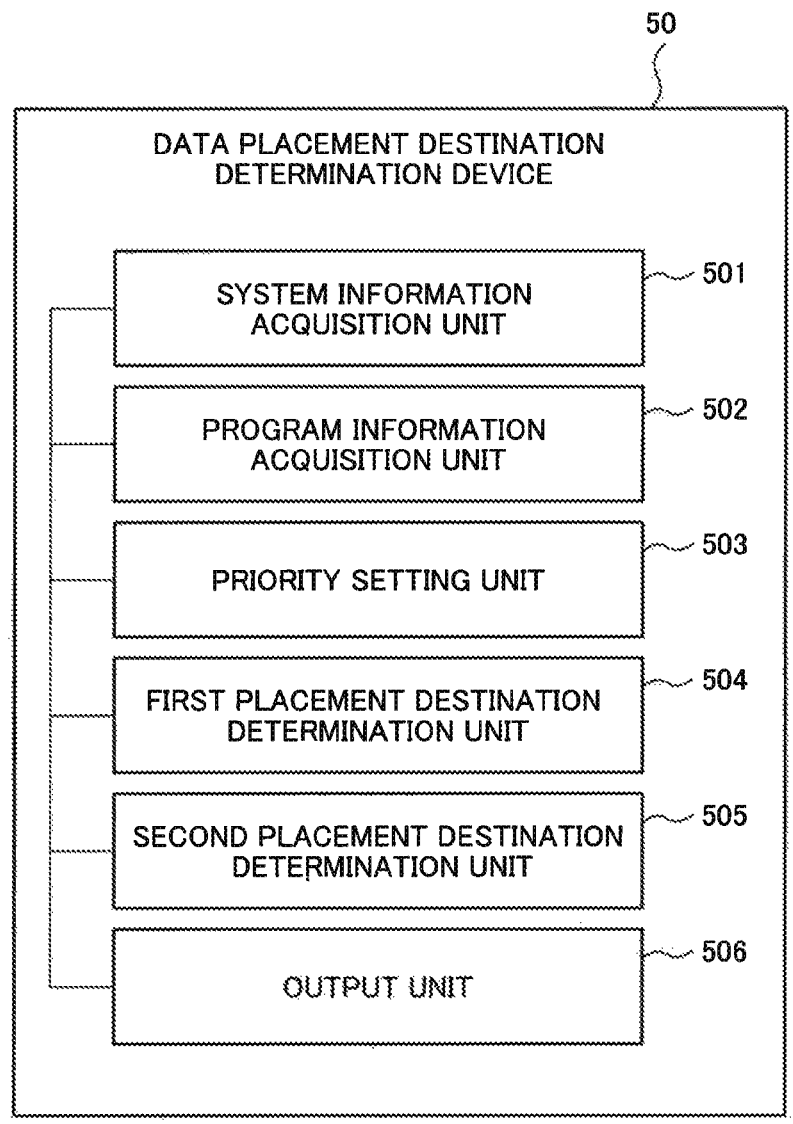
FIG. 19 is a block diagram illustrating a configuration example of a data placement destination determination device according to a fifth example embodiment.

FIG. 19 is a block diagram illustrating a configuration example of the data placement destination determination device 50 according to a fifth example embodiment of the present invention. As illustrated in FIG. 19, the data placement destination determination device 50 includes an output unit 506 in addition to the data placement destination determination device 50 illustrated in FIG. 18.

The output unit 506 outputs the placement destinations determined by the first placement destination determination unit 504 and the second placement destination determination unit 505.

In each example embodiment described above, each unit illustrated in FIGS. 3, 18, and 19 can be implemented by a dedicated HW (HardWare) (electronic circuit). Each unit can be regarded as a function (process) unit (software module) of a software program. However, the segmented configurations of the units shown in the figures are illustrated for convenience of explanation, and it can be assumed that various configurations are employed for implementation. An example of a hardware environment in this case will be described with reference to FIG. 20.

Figure 20:
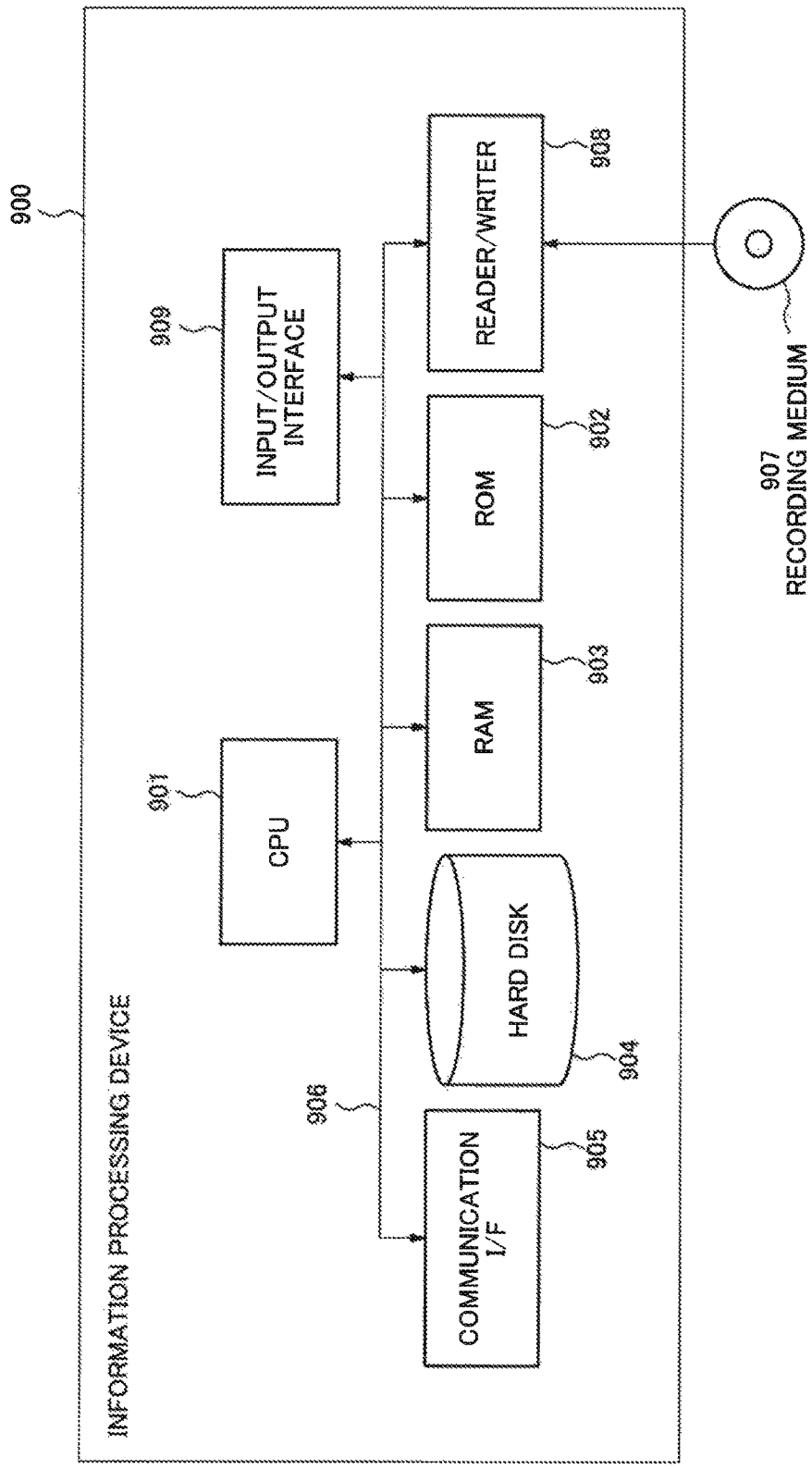
FIG. 20 is a diagram illustrating an example of a hardware configuration for implementing the data placement destination determination device according to each example embodiment of the present invention.

FIG. 20 is an explanatory diagram illustrating a configuration of an information processing device 900 (computer) capable of executing the data placement destination determination device according to an exemplary embodiment of the present invention. Specifically, FIG. 20 illustrates a configuration of a computer (information processing device) capable of implementing the data placement destination determination devices illustrated in FIGS. 3, 18, and 19, and also illustrates a hardware environment in which each function according to the example embodiments described above can be implemented.

The information processing device 900 illustrated in FIG. 20 includes the following components.

CPU (Central Processing Unit) 901,
ROM (Read_Only_Memory) 902,
RAM (Random_Access_Memory) 903,
Hard disk 904 (storage device),
Communication interface 905 (Interface: hereinafter referred to as "I/F") with an external device,
Reader/writer 908 which is capable of reading and writing data stored in a recording medium 907 such as a CD-ROM (Compact_Disc_Read_Only_Memory), and
Input/output interface 909, The information processing device 900 is a general computer to which the above-mentioned components are connected via a bus 906 (communication line).

In the example embodiments of the present invention, which have been described above as examples, a computer program capable of implementing the following functions is supplied to the information processing device 900 illustrated in FIG. 20. The functions include the system information acquisition unit 101, the program information acquisition unit 102, the priority setting unit 103, the in-band placement destination determination unit 104, and the out-of-band placement destination determination unit 105, which are illustrated in the block configuration diagrams referred to in the descriptions of the example embodiments, or the functions of the flowcharts (FIGS. 6 to 8, FIGS. 11 to 13, and FIGS. 15 to 17). After that, the computer program is loaded into the CPU 901 of the hardware and the loaded computer program is interpreted and executed, thereby achieving the present invention. The computer program supplied into the device may be stored in a non-volatile storage device, such as a readable/writable volatile storage memory (RAM 903) or the hard disk 904.

In the above case, as a method for supplying the computer program into the hardware, a general procedure can be employed at present. Examples of the procedure include a method of installing the computer program into the device via various types of recording media 907 such as a CD-ROM, and a method of downloading the computer program from the outside of the device via a communication line such as the Internet. In such cases, each example embodiment of the present invention is regarded as being composed of a code that constitutes the computer program, or the recording medium 907 storing the code.

While the present invention has been described above with reference to example embodiments, the present invention is not limited to the above example embodiments. The configuration and details of the present invention can be modified in various ways that can be understood by those skilled in the art within the scope of the present invention.

The whole or part of the example embodiments described above can be described as, but not limited to, the following supplementary notes.

(Supplementary note 1) A data placement destination determination device including:

a program information acquisition unit that acquires program information including a required bandwidth and a required size for a memory of each target program that is at least a program which is a target to be determined a placement destination of data among programs to be executed in a target system;

a system information acquisition unit that acquires system information including information about a memory bandwidth and a memory size for each candidate memory that is a placement destination candidate memory of data used for each target program;

a priority setting unit that sets a priority for each target program based on a required bandwidth, and sets a priority for each candidate memory based on a memory bandwidth;

a first placement destination determination unit that determines a placement destination of data used in each target program among candidate memories, based on the priorities set by the priority setting unit, in a range not exceeding the memory size and the memory bandwidth of each of the candidate memories; and a second placement destination determination unit that determines, when there is a placement destination undetermined program whose placement destination is not determined by the first placement destination determination unit, a placement destination of the placement destination undetermined program based on the priority of the placement destination undetermined program, the required bandwidth of each target program, and the memory bandwidth of each candidate memory, in a range not exceeding the memory size of each candidate memory.

(Supplementary note 2) The data placement destination determination device according to Supplementary note 1, in which the second placement destination determination unit determines the candidate memory which minimizes an increase of a total execution time of target programs due to an excess of the bandwidth to be the placement destination of the placement destination undetermined program.

(Supplementary note 3) The data placement destination determination device according to Supplementary note 1 or 2, in which the program information acquisition unit acquires program information including at least information about a required bandwidth and a required size for each partial process obtained by dividing a target program;

the priority setting unit sets a priority for each partial process of the target program based on the required bandwidth, and sets a priority for each candidate memory based on the memory bandwidth;

the first placement destination determination unit determines a data placement destination for each partial process of the target program based on the priorities set by the priority setting unit, in a range not exceeding the memory size and the memory bandwidth of each candidate memory; and the second placement destination determination unit determines, when there is a placement destination undetermined partial process whose placement destination is not determined by the first placement destination determination unit, the placement destination of the placement destination undetermined partial process based on the priority of the placement destination undetermined partial process, the required bandwidth of each partial process, and the memory bandwidth of each candidate memory, in a range not exceeding the memory size of each candidate memory.

(Supplementary note 4) The data placement destination determination device according to Supplementary note 1 or 2, in which the program information acquisition unit acquires program information including at least information about a required bandwidth and a variable to be used for each partial process obtained by dividing a target program;

the priority setting unit sets a priority for each variable used in each partial process of the target program based on the required bandwidth, and sets a priority for each candidate memory based on the memory bandwidth;

the first placement destination determination unit determines a placement destination of each variable used in each partial process of the target program, based on the priorities set by the priority setting unit, in a range not exceeding the memory size and the memory bandwidth of each candidate memory; and the second placement destination determination unit determines, when there is a placement destination undetermined variable whose placement destination is not determined by the first placement destination determination unit, the placement destination of the placement destination undetermined partial process based on the priority of the placement destination undetermined variable, the required bandwidth of each partial process using each variable, and the memory bandwidth of each candidate memory, in a range not exceeding the memory size of each candidate memory.

(Supplementary note 5) The data placement destination determination device according to any one of Supplementary notes 1 to 4, in which the second placement destination determination unit determines a placement determination of a placement destination undetermined program, a placement destination undetermined partial process, or a placement destination undetermined variable based on a memory bandwidth excess degree indicating a degree of excess of the memory bandwidth in the candidate memory after placement in each of the candidate memories in which the placement destination undetermined program, the placement destination undetermined partial process, or the placement destination undetermined variable can be placed.

(Supplementary note 6) The data placement destination determination device according to Supplementary note 5, in which the second placement destination determination unit calculates, for each candidate memory in which a placement destination undetermined program, a placement destination undetermined partial process, or a placement destination undetermined variable can be placed, an increase rate of a total execution time of the target programs which set the candidate memory as the data placement destination according to a memory bandwidth excess degree in the candidate memory after placement, and determines a candidate memory having the smallest increase rate to be the placement destination.

(Supplementary note 7) The data placement destination determination device according to Supplementary note 5 or 6, in which the second placement destination determination unit calculates, for each candidate memory in which a placement destination undetermined program, a placement destination undetermined partial process, or a placement destination undetermined variable can be placed, an increase rate of a total execution time of the target programs which set the candidate memory as the data placement destination by using a memory bandwidth excess degree in the candidate memory after placement and an execution time of each target program which sets the candidate memory as the data placement destination, and determines a candidate memory having the smallest increase rate to be the placement destination.

(Supplementary note 8) The data placement destination determination device according to Supplementary note 5 or 6, in which the second placement destination determination unit calculates, for each candidate memory in which a placement destination undetermined program, a placement destination undetermined partial process, or a placement destination undetermined variable can be placed, an increase degree of an execution time of each target program in the candidate memory based on the memory bandwidth excess degree in the candidate memory after placement, the target program which sets the candidate memory as the data placement destination, or information related to the memory access time during the execution of each partial process, and determines a candidate memory having the smallest increase degree to be the placement destination.

(Supplementary note 9) The data placement destination determination device according to Supplementary note 5 or 6, in which the second placement destination determination unit calculates, for each candidate memory in which a placement destination undetermined program, a placement destination undetermined partial process, or a placement destination undetermined variable can be placed, an increase value of an execution time of each target program in the candidate memory based on the memory bandwidth excess degree in the candidate memory after placement, and the execution time of each target program or partial process which sets the candidate memory as the data placement destination, and determines a candidate memory having the smallest increase value to be the placement destination.

(Supplementary note 10) The data placement destination determination device according to any one of Supplementary notes 1 to 9, including an output unit that outputs a placement destination determination result.

INDUSTRIAL APPLICABILITY

The present invention can also be suitably applied to, for example, applications for acquiring information to be referred to for a placement destination of data used for a service program to be executed in a target memory, and applications for acquiring information to be referred to for an execution time of a service program when memories having different memory bandwidth are added.

This application is based upon and claims the benefit of priority from Japanese patent application No. 2015-067975, filed on Mar. 30, 2015, the disclosure of which is incorporated herein in its entirety by reference.

REFERENCE SIGNS LIST

1 Processor
2 Memory
10 Data placement destination determination device
101 System information acquisition unit
102 Program information acquisition unit
103 Priority setting unit
104 In-band placement destination determination unit
105 Out-of-band placement destination determination unit
50 Data placement destination determination device
501 System information acquisition unit
502 Program information acquisition unit
503 Priority setting unit
504 First placement destination determination unit
505 Second placement destination determination unit
506 Output unit

The invention claimed is:

1. A data placement destination determination device comprising:
   a memory storing instructions; and
   one or more processors configured to execute the instructions to:
   acquire a required bandwidth and a required size of a memory for each of target programs which is a target to be determined a placement destination of data used for each of the target programs;
   acquire a memory bandwidth and a memory size for each of candidate memories which is a candidate of a placement destination of data used for the target programs;
   set a priority for each of the target programs based on the required bandwidth and setting a priority for each of the candidate memories based on the memory bandwidth;
   determine a placement destination of data used for each of the target programs from the candidate memories, based on the priorities, in a range not exceeding the memory size and the memory bandwidth of each of the candidate memories; and
   determine a placement destination of a placement destination undetermined program whose placement destination is not determined, based on the priority of the placement destination undetermined program, a required bandwidth of each of the target programs, and a memory bandwidth of each of the candidate memories, in a range not exceeding the memory size of each of the candidate memories.

2. The data placement destination determination device according to claim 1, wherein
   the one or more processors are further configured to execute the instructions to:
   determine as a placement destination of the placement destination undetermined program, a candidate memory which minimizes an increase of a total execution time of the target program due to an excess of the bandwidth.

3. The data placement destination determination device according to claim 2, wherein
   the one or more processors are further configured to execute the instructions to:
   acquire program information including at least information about the required bandwidth and the required size for each of partial processes obtained by dividing the target program,
   set the priority based on the required bandwidth for each of the partial processes of the target program, and sets the priority based on the memory bandwidth for each of the candidate memories,
   determine a data placement destination for each of the partial processes of the target program, based on the priority, in a range not exceeding the memory size and the memory bandwidth of each of the candidate memories, and determine a placement destination of a placement destination undetermined partial process whose placement destination is not determined, based on the priority of the placement destination undetermined partial process, the required bandwidth of the partial process, and the memory bandwidth of the candidate memory, in a range not exceeding the memory size of each of the candidate memories.

4. The data placement destination determination device according to claim 2, wherein the one or more processors are further configured to execute the instructions to:

acquire program information including at least information about the required bandwidth and a variable to be used, for each of the partial processes obtained by dividing the target program, set the priority based on the required bandwidth for each of the variables used in the partial processes of the target program, and sets the priority based on the memory bandwidth for each of the candidate memories, determine a placement destination of each of the variables used in the partial processes of the target program, based on the priority, in a range not exceeding the memory size and the memory bandwidth of each of the candidate memories, and determine a placement destination of a placement destination undetermined variable whose placement destination is not determined, based on the priority of the placement destination undetermined variable, the required bandwidth of the partial process using the variable, and the memory bandwidth of the candidate memory, in a range not exceeding the memory size of each of the candidate memories.

5. The data placement destination determination device according to claim 1, wherein the one or more processors are further configured to execute the instructions to:

acquire program information including at least information about the required bandwidth and the required size for each of partial processes obtained by dividing the target program, set the priority based on the required bandwidth for each of the partial processes of the target program, and sets the priority based on the memory bandwidth for each of the candidate memories, determine a data placement destination for each of the partial processes of the target program, based on the priority, in a range not exceeding the memory size and the memory bandwidth of each of the candidate memories, and determine a placement destination of a placement destination undetermined partial process whose placement destination is not determined, based on the priority of the placement destination undetermined partial process, the required bandwidth of the partial process, and the memory bandwidth of the candidate memory, in a range not exceeding the memory size of each of the candidate memories.

6. The data placement destination determination device according to claim 1, wherein the one or more processors are further configured to execute the instructions to:

acquire program information including at least information about the required bandwidth and a variable to be used, for each of the partial processes obtained by dividing the target program, set the priority based on the required bandwidth for each of the variables used in the partial processes of the target program, and sets the priority based on the memory bandwidth for each of the candidate memories, determine a placement destination of each of the variables used in the partial processes of the target program, based on the priority, in a range not exceeding the memory size and the memory bandwidth of each of the candidate memories, and determine a placement destination of a placement destination undetermined variable whose placement destination is not determined, based on the priority of the placement destination undetermined variable, the required bandwidth of the partial process using the variable, and the memory bandwidth of the candidate memory, in a range not exceeding the memory size of each of the candidate memories.

7. The data placement destination determination device according to claim 6, wherein the one or more processors are further configured to execute the instructions to:

determine a placement destination of the placement destination undetermined program, the placement destination undetermined partial process, or the placement destination undetermined variable, based on a memory bandwidth excess degree indicating a degree of exceeding a memory bandwidth in the candidate memory after placement, in each of the candidate memories in which the placement destination undetermined program, the placement destination undetermined partial process, or the placement destination undetermined variable is placeable.

8. The data placement destination determination device according to claim 7, wherein the one or more processors are further configured to execute the instructions to:

calculate, for each of the candidate memories in which the placement destination undetermined program, the placement destination undetermined partial process, or the placement destination undetermined variable is placeable, an increase rate of a total execution time of the target programs which set the candidate memory depending on a memory bandwidth excess degree of the candidate memory after placement, as a data placement destination, and determines a candidate memory with the smallest increase rate as a placement destination.

9. The data placement destination determination device according to claim 8, wherein the one or more processors are further configured to execute the instructions to:

calculate, for each of the candidate memories in which the placement destination undetermined program, the placement destination undetermined partial process, or the placement destination undetermined variable is placeable, an increase rate of a total execution time of the target programs which set the candidate memory as a data placement destination, by using a memory bandwidth excess degree in the candidate memory after placement, and an execution time of the target program which sets the candidate memory as a data placement destination, and determines a candidate memory with the smallest increase rate as a placement destination.

10. The data placement destination determination device according to claim 7, wherein the one or more processors are further configured to execute the instructions to:

calculate, for each of the candidate memories in which the placement destination undetermined program, the placement destination undetermined partial process, or the placement destination undetermined variable is placeable, an increase rate of a total execution time of the target programs which set the candidate memory as a data placement destination, by using a memory bandwidth excess degree in the candidate memory after placement, and an execution time of the target program which sets the candidate memory as a data placement destination, and determines a candidate memory with the smallest increase rate as a placement destination.

11. The data placement destination determination device according to claim 1, wherein the one or more processors are further configured to execute the instructions to:

output a determined placement destination.

12. A data placement destination determination method performed by an information processing device comprising:

acquiring a required bandwidth and a required size of a memory for each of target programs which is a target to be determined a placement destination of data used for each of the target programs, and a memory bandwidth and a memory size for each of candidate memories which is a candidate of a placement destination of data used for the target programs;

setting a priority for each of the target programs based on the required bandwidth and setting a priority for each of the candidate memories based on the memory bandwidth;

determining a placement destination of data used for each of the target programs from the candidate memories, based on the priorities of the target programs and the priorities of the candidate memories, in a range not exceeding the memory size and the memory bandwidth of each of the candidate memories; and determining a placement destination of a placement destination undetermined program whose placement destination is not determined, based on the priority of the placement destination undetermined program, a required bandwidth of each of the target programs, and a memory bandwidth of each of the candidate memories, in a range not exceeding the memory size of each of the candidate memories.

13. A storage medium storing a data placement destination determination program that causes a computer to execute:

a process that acquires a required bandwidth and a required size of a memory for each of target programs which is a target to be determined a placement destination of data used for each of the target programs;

a process that acquires a memory bandwidth and a memory size for each of candidate memories which is a candidate of a placement destination of data used for the target programs;

a process that sets a priority for each of the target programs based on the required bandwidth and setting a priority for each of the candidate memories based on the memory bandwidth;

a process that determines a placement destination of data used for each of the target programs from the candidate memories, based on the priorities of the target programs and the priorities of the candidate memories, in a range not exceeding the memory size and the memory bandwidth of each of the candidate memories; and a process that determines a placement destination of a placement destination undetermined program whose placement destination is not determined, based on the priority of the placement destination undetermined program, a required bandwidth of each of the target programs, and a memory bandwidth of each of the candidate memories, in a range not exceeding the memory size of each of the candidate memories.

* * * * *